United States Patent
Harada et al.

(10) Patent No.: US 8,514,201 B2
(45) Date of Patent: Aug. 20, 2013

(54) IMAGE PICKUP DEVICE, DISPLAY-AND-IMAGE PICKUP DEVICE, AND ELECTRONIC DEVICE

(75) Inventors: Tsutomu Harada, Kanagawa (JP); Yasuyuki Matsui, Kanagawa (JP); Daisuke Takama, Kanagawa (JP); Go Yamanaka, Kanagawa (JP); Yoshiharu Nakajima, Kanagawa (JP); Hiroshi Mizuhashi, Kanagawa (JP); Hideyuki Omori, Kanagawa (JP); Ryoichi Tsuzaki, Kanagawa (JP)

(73) Assignee: Japan Display West, Inc., Chita (JP)

( * ) Notice: Subject to any disclaimer, the term of this patent is extended or adjusted under 35 U.S.C. 154(b) by 189 days.

(21) Appl. No.: 12/809,810

(22) PCT Filed: Oct. 14, 2009

(86) PCT No.: PCT/JP2009/067784
§ 371 (c)(1),
(2), (4) Date: Jun. 21, 2010

(87) PCT Pub. No.: WO2010/047256
PCT Pub. Date: Apr. 29, 2010

(65) Prior Publication Data
US 2010/0271336 A1 Oct. 28, 2010

(30) Foreign Application Priority Data
Oct. 21, 2008 (JP) .................. 2008-271349

(51) Int. Cl.
*G06F 3/043* (2006.01)
(52) U.S. Cl.
USPC ........................ 345/175; 178/18.09

(58) Field of Classification Search
USPC ................... 345/173–178; 178/18.01–18.09, 178/18.11
See application file for complete search history.

(56) References Cited

U.S. PATENT DOCUMENTS

| | | | |
|---|---|---|---|
| 7,190,336 B2 * | 3/2007 | Fujisawa | 345/81 |
| 7,684,029 B2 * | 3/2010 | Tan et al. | 356/221 |
| 2006/0007224 A1 | 1/2006 | Hayashi et al. | |
| 2006/0157641 A1 * | 7/2006 | Kuan | 250/208.1 |
| 2006/0214892 A1 | 9/2006 | Harada et al. | |
| 2006/0244693 A1 | 11/2006 | Yamaguchi et al. | |

FOREIGN PATENT DOCUMENTS

| | | |
|---|---|---|
| JP | 2004-127272 | 4/2004 |
| JP | 2006-276223 | 10/2006 |

* cited by examiner

*Primary Examiner* — Stephen Sherman
(74) *Attorney, Agent, or Firm* — Robert J. Depke; The Chicago Technology Law Group, LLC

(57) ABSTRACT

Provided is an image pickup device with which object detection can be performed with a good stability no matter in what use conditions. A display area 21 of an I/O display panel 20 is provided therein with a plurality of main sensors 32 each including, as a photosensitive wavelength region, a wavelength region $\Delta\lambda 23$ of detection light for use to detect any proximity object, and a plurality of auxiliary sensors 33 whose photosensitivity in the wavelength region of the detection light is lower than photosensitivity of the main sensors 32. Moreover, with use of a composite image F derived based on a differential image MC obtained by the main sensors 32 and a differential image HC obtained by the auxiliary sensors 33, object information about the proximity object is acquired. Accordingly, even when the proximity object is moving on the display area 21 of the I/O display panel 20, for example, any false signal can be prevented from being generated in the composite image F.

19 Claims, 29 Drawing Sheets

IMAGE PICKUP DEVICE, DISPLAY-AND-IMAGE PICKUP DEVICE, AND ELECTRONIC DEVICE

This application is a 371 U.S. National Stage filing of PCT/JP2009/067784, filed Oct. 14, 2009, which claims priority to Japanese Patent Application Number JP 2008-271349 filed Oct. 21, 2008, all of which are incorporated herein by reference.

TECHNICAL FIELD

The present invention relates to an image pickup device and a display-and-image-pickup device for use to acquire information about the position or others of any object being in touch with or being proximal to a panel, and an electronic device provided with such a display-and-image-pickup device.

BACKGROUND ART

There is a previously known technology of detecting the position or others of any object being in touch with or being in proximal to the display surface of a display device. This technology includes a typically and generally popular technology, which is about a display device provided with a touch panel.

The touch panel is also of various types, and the type being generally popular is to detect a capacitance. The panel of such a type is so configured as to detect the position or others of any object by sensing any change of the surface charge of the touch panel caused by a finger touch on the panel. Accordingly, using the touch panel of such a type allows a user's intuitive operation.

Herein, in Patent Literature 1 and Patent Literature 2, for example, the applicant of this application is proposing a display device provided with a display section (display-and-image-pickup panel), having a display function of image display and an image pickup function (detection function) of object image pickup (detection).

CITATION LIST

Patent Literatures

PTL 1: Japanese Unexamined Patent Application Publication No. 2004-127272
PTL 2: Japanese Unexamined Patent Application Publication No. 2006-276223

SUMMARY OF THE INVENTION

With the use of the display device described in Patent Literature 1 above, when an object such as finger is brought to touch or come in close onto the display-and-image-pickup panel thereof, for example, reflection light being light irradiated from the display-and-image-pickup panel and reflected by the object may be used to detect the position or others of the object based on any captured image. Accordingly, with the use of such a display device, there is no more need to additionally provide any component such as touch panel on the display-and-image-pickup panel, and with the simple configuration, the position or others of any object is detected.

When reflection light being a result of light reflection by the object is used as described above, however, there has sometimes been caused a problem of characteristics variations or others of the outside light and photoreceptors. More specifically, light to be received varies in intensity depending on the brightness of the outside light, thereby sometimes resulting in a difficulty in detecting the position or others of the object based on the captured image. Moreover, the characteristics variations or others of the photoreceptors resultantly cause fixed noise, thereby also sometimes resulting in a difficulty in detecting the position or others of the object based on the captured image.

In consideration thereof, in Patent Literature 2 above, such influence due to the outside light and the fixed noise described above is attempted to be removed by finding a difference between an image obtained in the state of light emission (image obtained with use of reflection light of irradiation light) and an image obtained in the state of no light emission. This is an attempt made to detect the position or others of any object with no influence by the outside light and the fixed noise.

In the actual use conditions, however, there exists a time difference between the above-described image obtained in the state of light emission and the image obtained in the state of no light emission. Therefore, when the object is moving at high speed on the display-and-image-pickup panel, for example, this time difference resultantly causes a positional displacement between the image obtained in the state of light emission and the image obtained in the state of no light emission. If with such a positional displacement, when a difference is taken between these two images, in addition to an originally-expected signal corresponding to the position of the object, a false signal is generated at another different position. As such, due to the existence of such a false signal, there has been a case where the stable object detection suffers from a difficulty. Note that this false signal has a tendency of being generated in a larger area when the object is moving at high speed, and the false signal also has a tendency of being intensified when the outside light is more intense.

As such, the previous technologies have a difficulty in detecting, with a good stability, any object being in touch with or being proximal to the panel no matter in what use conditions, and thus there is a room for improvement.

The present invention is proposed in consideration of the problems described above, and an object thereof is to provide an image pickup device, a display-and-image-pickup device, and an object detection method with which object detection can be completed with a good stability no matter in what use conditions, and an electronic device provided with such a display-and-image-pickup device.

An image pickup device of an embodiment of the invention includes: an image pickup panel provided with a plurality of first photoreceptors, a plurality of second photoreceptors, and an irradiation light source that emits light including detection light for detecting a proximity object, wavelengths of the detection light lying in a predetermined wavelength region; and an image processing section performing an image processing on signals which are captured by the image pickup panel through image-picking up the proximity object, thereby acquiring object information including one or more of position, shape, or size of the proximity object. In this device, a photosensitive wavelength region of the first photoreceptors includes the wavelength region of the detection light. Moreover, a photosensitivity of the second photoreceptors is lower than a photosensitivity of the first photoreceptors, in the wavelength region of the detection light. Further, the image processing section acquires the object information by processing the signals coming from the first and second photoreceptors.

A display-and-image-pickup device of an embodiment of the invention includes: a display-and-image-pickup panel provided with a plurality of display elements, a plurality of first photoreceptors and a plurality of second photoreceptors, and emitting light including detection light for detecting a proximity object, wavelengths of the detection light lying in a predetermined wavelength region; and an image processing section performing an image processing on signals which are captured by the display-and-image-pickup panel through image-picking up the proximity object, thereby acquiring object information including one or more of position, shape, or size of the proximity object. In this device, a photosensitive wavelength region of the first photoreceptors includes the wavelength region of the detection light. Moreover, a photosensitivity of the second photoreceptors is lower than a photosensitivity of the first photoreceptors, in the wavelength region of the detection light. Further, the image processing section acquires the object information by processing the signals coming from the first and second photoreceptors.

An electronic device of an embodiment of the invention includes the above-described display-and-image-pickup device provided with an image display function and an image pickup function.

With an image pickup device, a display-and-image-pickup device, and an electronic device of an embodiment of the invention, signals which are captured by the image pickup panel (display-and-image-pickup panel) through image-picking up the proximity object is image-processed, thereby acquiring object information about the proximity object. To be specific, the object information is acquired with use of a composite image obtained based on an image captured by the first photoreceptor and an image captured by the second photoreceptor, for example. In this example, since the first photoreceptors each include the wavelength region of the detection light described above as photosensitive wavelength region, when the proximity object is moving on the image pickup panel (or on the display-and-image-pickup panel), the image captured by the first photoreceptors may cause therein a false signal in addition to a detection signal of the proximity object. On the other hand, since the photosensitivity of the second photoreceptors is lower than a photosensitivity of the first photoreceptors, in the wavelength region of the detection light described above, the image captured by the second photoreceptors may also cause therein a false signal similarly to the case with the first photoreceptors but the detection signal of the proximity object is prevented from being generated. Accordingly, even when the proximity object is moving on the image pickup panel (or on the display-and-image-pickup panel), acquiring the object information with use of a composite image obtained based on the image captured by the first photoreceptor and the image captured by the second photoreceptor can favorably prevent any false signal from being generated in the composite image.

With an image pickup device, a display-and-image-pickup device, or an electronic device of an embodiment of the invention, an image pickup panel (or a display-and-image-pickup panel) is provided therein with a plurality of first photoreceptors each including a wavelength region of detection light for detecting a proximity object in the photosensitive wavelength region, and a plurality of second photoreceptors whose photosensitivity in the wavelength region of the detection light is lower than the photosensitivity of the first photoreceptors, and the object information about the proximity object is acquired by processing the signals coming from such first and second photoreceptors. This thus enables to prevent any false signal from being generated even when the proximity object is moving on the image pickup panel (or on the display-and-image-pickup panel), for example. Accordingly, object detection can be performed with a good stability no matter in what use conditions.

BEST MODE(S) FOR CARRYING OUT THE INVENTION

Figure 1:
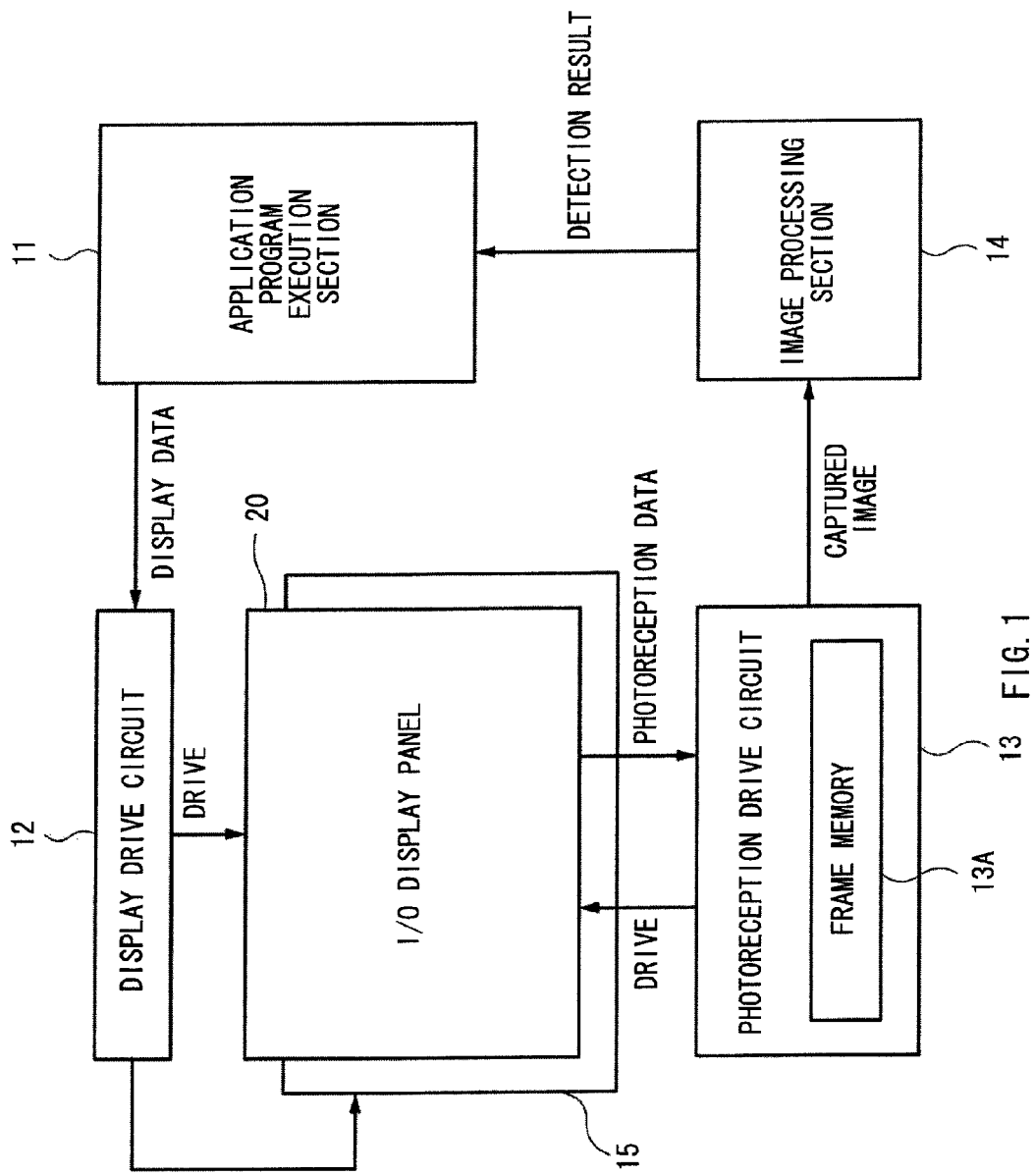
FIG. 1 is a block diagram showing the configuration of a display-and-image-pickup device of an embodiment of the invention.

In the below, an embodiment of the invention will be described in detail by referring to the drawings.

[Example of Entire Configuration of Display-and-Image-Pickup Device]

FIG. 1 is a diagram showing the entire configuration of a display-and-image-pickup device of an embodiment of the invention. This display-and-image-pickup device is configured to include an I/O display panel 20, a backlight 15, a display drive circuit 12, a photoreception drive circuit 13, an image processing section 14, and an application program execution section 11.

The I/O display panel 20 is configured by a liquid crystal panel (LCD; Liquid Crystal Display) on which a plurality of pixels are arranged in a matrix thereover. This I/O display panel 20 not only has a function (display function) of displaying images of graphics, text, and others predetermined based on display data but also a function (image pickup function) of image pick up any object (proximity object) being in touch with or being proximal to the I/O display panel 20 as will be described later. Further, the backlight 15 is configured by arranging a plurality of light-emitting diodes, for example, and is a light source for display and detection use of the I/O display panel 20. As will be described later, this backlight 15 is so configured as to perform an ON/OFF operation at high speed at a predetermined timing in synchronization with the operation timing of the I/O display panel 20.

The display drive circuit 12 is a circuit in charge of driving the I/O display panel 20 (driving for a line-sequential display operation) to display images based on the display data on the I/O display panel 20 (to perform a display operation).

The photoreception drive circuit 13 (image generation section) is a circuit in charge of driving the I/O display panel 20 (driving it to perform a line-sequential image pickup operation) to obtain a photoreception signal (image pickup signal) from each of the pixels of the I/O display panel 20 (to subject an object to image pickup). Further, this photoreception drive circuit 13 is so configured as to generate a composite image that will be described later by performing predetermined image processing (image generation process) with respect to the photoreception signal coming from each of the pixels. Furthermore, the resulting composite image is accumulated in a frame memory 13A on a frame basis, for example, and then is output to the image processing section 14 as a captured image. In addition, such an image generation process will be described in detail later.

The image processing section 14 is the one in charge of performing predetermined image processing (computation process) based on the captured image (composite image) provided by the photoreception drive circuit 13, and detecting and acquiring object information about the proximity object (including position coordinates data, and data about object shape and size, for example). In addition, the process of detection as such will be described in detail later.

The application program execution section 11 is the one in charge of performing a process in accordance with any predetermined application software based on the detection result derived by the image processing section 14. Such a process is to provide the position coordinates of the detected object to the display data and to display on the I/O display panel 20, for example. Note here that the display data to be generated by the application program execution section 11 is to be supplied to the display drive circuit 12.

[Detailed Configuration Example of I/O Display Panel]

Figure 2:
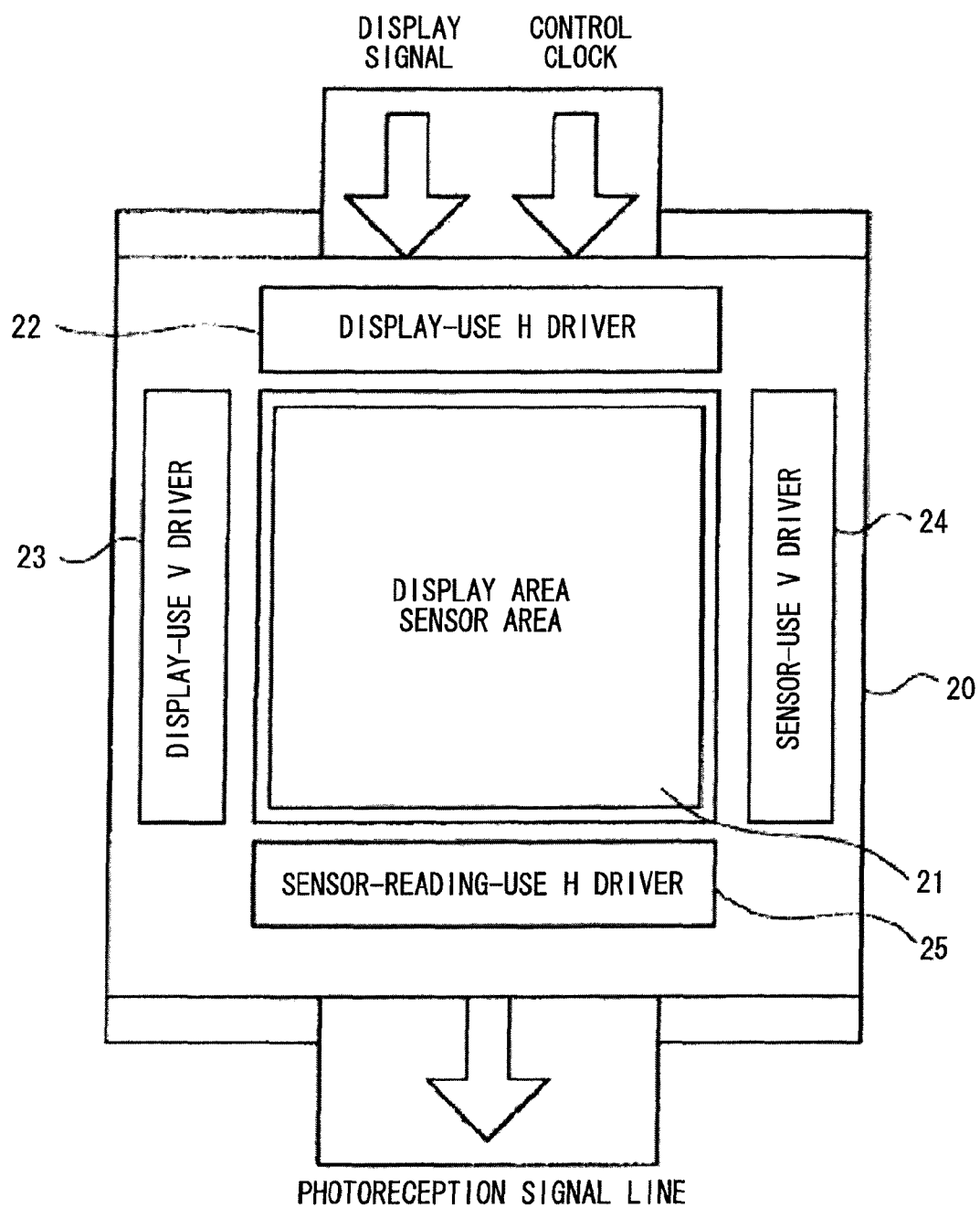
FIG. 2 is a block diagram showing an exemplary configuration of an I/O display panel of FIG. 1.

By referring to FIG. 2, described next is a detailed configuration example of the I/O display panel 20. This I/O display panel 20 is configured to include a display area (sensor area) 21, a display-use H driver 22, a display-use V driver 23, a sensor-reading-use H driver 25, and a sensor-use V driver 24.

The display area 21 is an area in which light coming from the backlight 15 is modulated for emission of irradiation light, and any object proximal to this area is subjected to image pickup. In this embodiment, the irradiation light includes display light, and detection light (infrared light, for example) from an infrared light source or others (not shown) for use to detect any proximity object (the same is applicable below). This display area 21 includes the matrix arrangement of liquid crystal elements each being a light-emitting element (display element) and photoreception sensors (main sensors 32 and auxiliary sensors 33 that will be described later) each being a photoreceptor (image pickup element).

The display-use H driver 22 is the one in charge of line-sequentially driving the liquid crystal elements of the pixels in the display area 21 together with the display-use V driver 23 based on a display signal for display driving use and a control clock, both of which are provided by the display drive circuit 12.

The sensor-reading-use H driver 25 is the one in charge of line-sequentially driving the photoreceptors of the pixels in the sensor area 21 together with the sensor-use V driver 24, and acquiring photoreception signals.

[Detailed Configuration Example of Each Pixel in Display Area]

Figure 3:
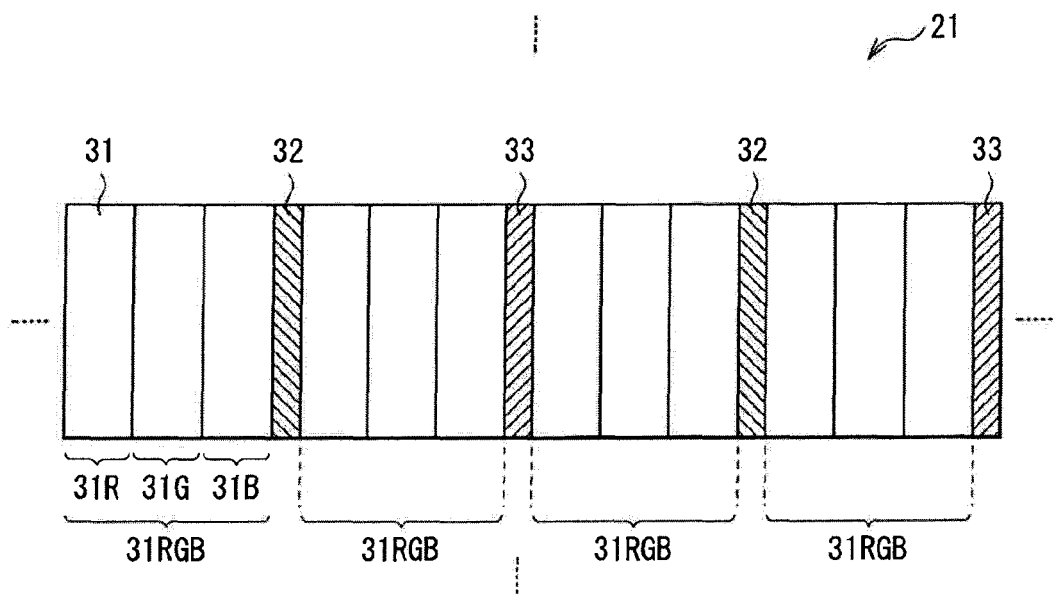
FIG. 3 is a plan view showing an exemplary pixel arrangement in a display area (sensor area) of FIG. 2.
Figure 4:
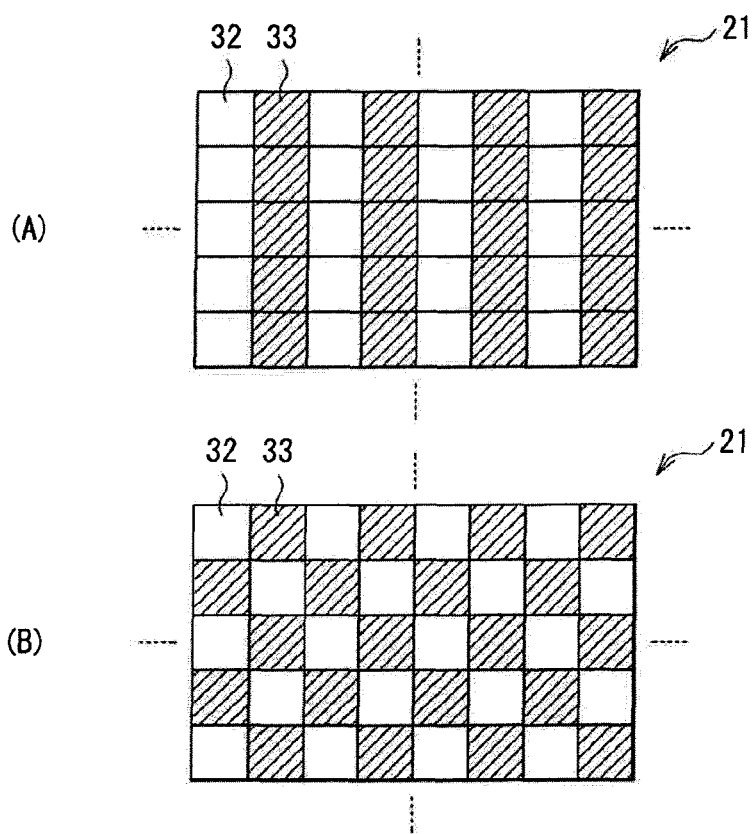
FIG. 4 is a schematic plan view showing exemplary layouts of main sensors and auxiliary sensors in the display area (sensor area) of FIG. 2.
Figure 5:
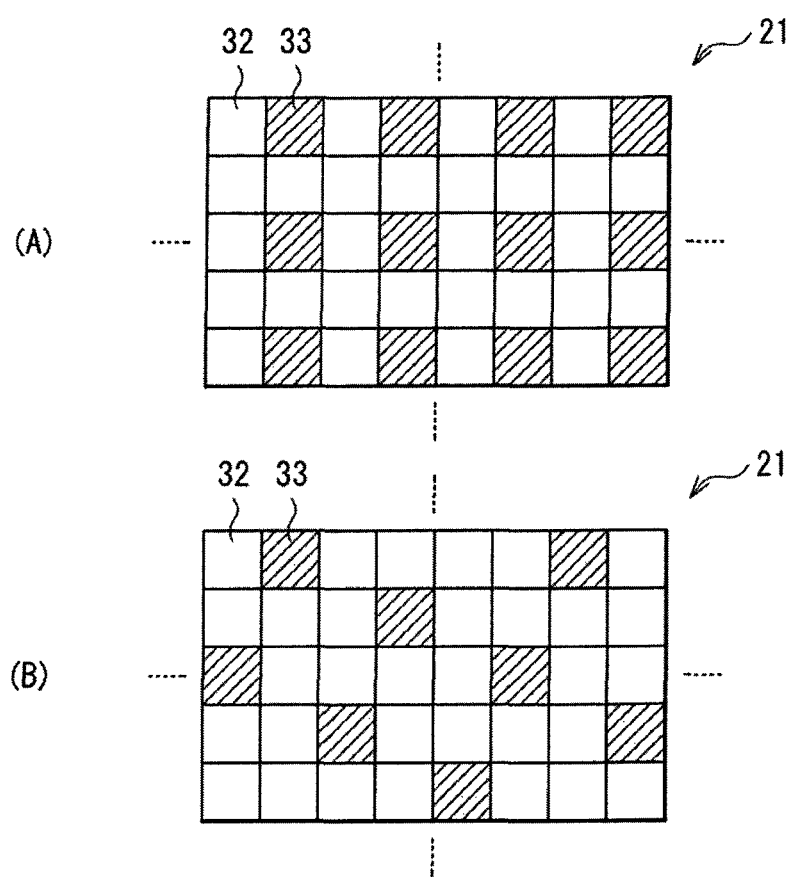
FIG. 5 is a schematic plan view showing exemplary layouts of the main sensors and the auxiliary sensors in the display area (sensor area) of FIG. 2.

Next, by referring to FIGS. 3 to 5, described is a detailed configuration example of each of the pixels in the display area 21.

First of all, as exemplarily shown in FIG. 3, a pixel 31 is configured by a display pixel (display section) 31RGB including a liquid crystal element, and an image pickup pixel (photoreception section). The display pixel 31RGB includes a display pixel 31R of red (R), a display pixel 31G of green (G), and a display pixel 31B of blue (B). Further, the photoreception section carries therein two types of photoreception sensors, i.e., the main sensors 32 (first photoreceptors) and the auxiliary sensors 33 (second photoreceptors). Note that, although FIG. 3 shows the one-to-one arrangement of the display pixels 31RGB and the photoreception sensors, alternatively, a plurality of display pixels 31RGB may share one photoreception sensor.

The main sensors 32 and the auxiliary sensors 33 as such are preferably arranged alternately with the one-to-one ratio on the display area 21 as shown in FIGS. 4(A) and (B), for example. As an alternative arrangement, as shown in FIGS. 5(A) and (B), for example, the auxiliary sensors 33 may be fewer in number than the main sensors 32. If this is the arrangement, the need arises to perform an interpolation process to the photoreception signals from the auxiliary sensors 33, thereby complicating the process, and requiring caution whether or not any possible incomplete detection may cause a problem depending on the type of signal and application. Note that, in FIGS. 4 and 5, for convenience of description, the display pixels 31RGB are not shown.

[Configuration Example of Wavelength Region in Light Source and in Photoreception Sensor]

Figure 6:
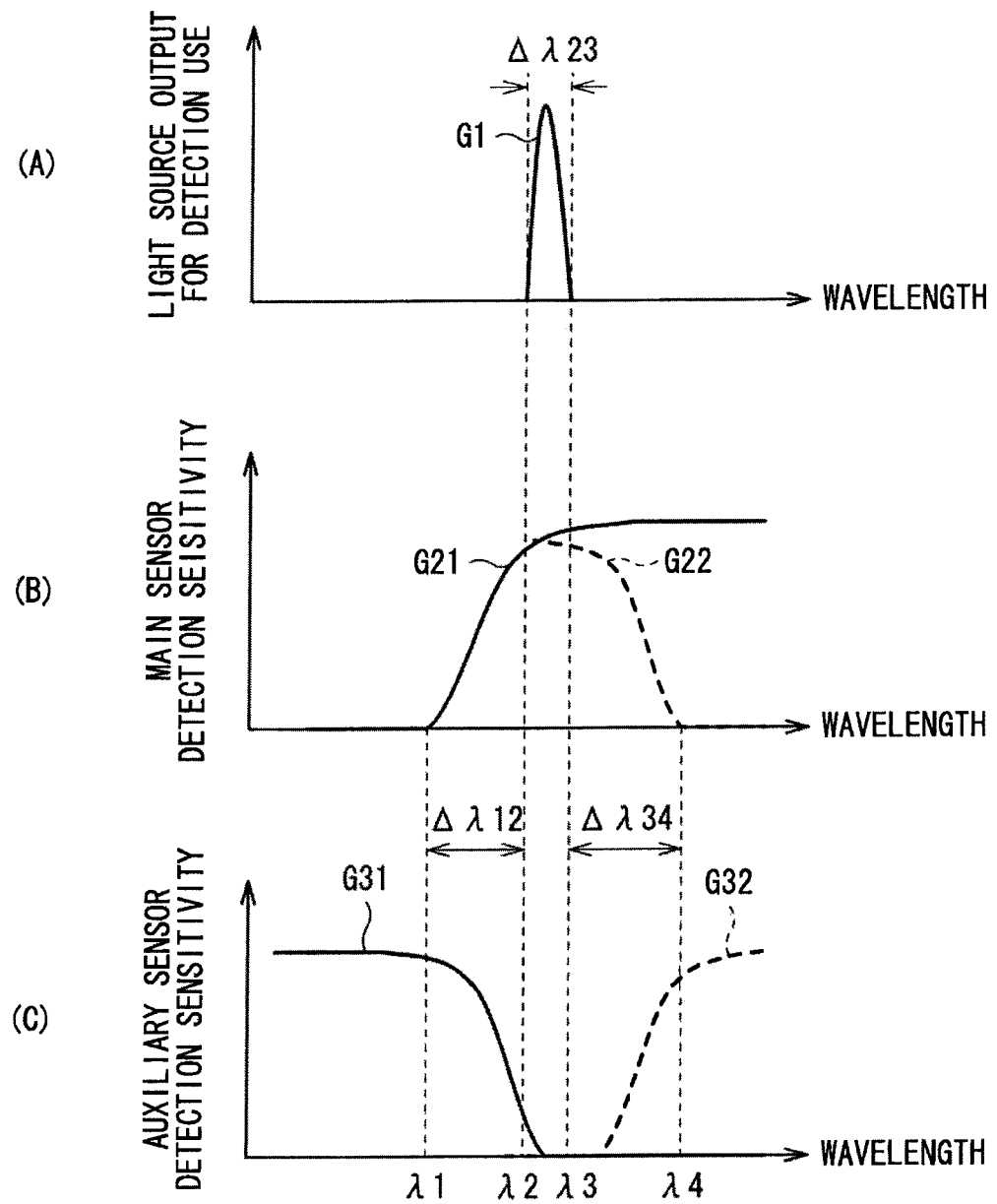
FIG. 6 is a characteristics diagram showing an exemplary relationship between a light-emitting wavelength region of a light source for detection use and detection wavelength regions for the respective use by the main sensors and the auxiliary sensors.

By referring to FIG. 6, described next is a configuration example of a wavelength region in the light source and in the photoreception sensor. FIG. 6 is the one showing an example of relationship between the light-emitting wavelength region in a detection-use light source (FIG. 6(A)) and the detection wavelength regions respectively in the main sensors 32 and in the auxiliary sensors 33 (FIGS. 6(B) and (C)).

First of all, as indicated by a reference symbol G21 in FIG. 6(B), in each of the main sensors 32, the photosensitive wavelength region is a wavelength region located on the long-wavelength side of wavelength of $\lambda 1$ or longer. Accordingly, these main sensors 32 each include, as the photosensitive wavelength region, a wavelength region $\Delta\lambda 23$ (wavelength region of wavelength of $\lambda 2$ to wavelength of $\lambda 3$) of detection light indicated by a reference symbol G1 in FIG. 6(A) for use to detect any proximity object, and is so configured as to function as a photoreception sensor for use to detect any proximity object. Herein, in the main sensors 32, the wavelength region $\Delta\lambda 23$ of the detection light has the photosensitivity higher than the photosensitivity in a predetermined wavelength region (wavelength region of wavelength shorter than wavelength of $\lambda 2$ in this example), which is different from that wavelength region.

On the other hand, as indicated by a reference symbol G31 in FIG. 6(C), in each of the auxiliary sensors 33, the photosensitive wavelength region is a wavelength region located on the short-wavelength side of wavelength of $\lambda 2$ or shorter. That is, the auxiliary sensors 33 each have the photosensitivity characteristics about the photosensitive wavelength region different from those of the above-described main sensors 23. Accordingly, in these auxiliary sensors 33, the wavelength region $\Delta\lambda 23$ of the detection light has the photosensitivity lower than that of the main sensors 32 (the photosensitivity is 0 (zero) in the wavelength region $\Delta\lambda 23$ of the detection light in this example). As such, the auxiliary sensors 33 are each so configured as to function as a photoreception sensor for use to detect any false signal that will be described later. Moreover, in the auxiliary sensors 33, the wavelength region $\Delta\lambda 23$ of the detection light has the photosensitivity lower than the photosensitivity in the above-described predetermined wavelength region (wavelength region of wavelength shorter than wavelength of $\lambda 2$ in this example). Note that, in this example, the wavelength region $\Delta\lambda 12$ (wavelength region of wavelength of $\lambda 1$ to wavelength of $\lambda 2$) is the photosensitive wavelength region used by both of the main sensors 32 and the auxiliary sensors 33.

To be specific, when the detection light for use is infrared light, the main sensors 32 may be each so configured as to include the wavelength region of this infrared light as the photosensitive wavelength region, and the auxiliary sensors 33 may be each so configured as to include the wavelength region of visible light or others as the photosensitive wavelength region. However, the relationship between the wavelength region of the detection light and the photosensitive wavelength regions respectively in the main sensors 32 and the auxiliary sensors 33 is not restrictive thereto. For example, the detection light for use may be a green light, and the photosensitive wavelength region in the auxiliary sensors 33 may include only the wavelength region of a red light. This case, however, necessitates attention to be sure that the auxiliary sensors 33 each receive outside light of wavelength that can be received by the main sensors 32 although the photosensitive wavelength region thereof preferably does not include the wavelength region of any detection light. This is because, as will be described later, the auxiliary sensors 33 are responsible for detecting any false signal resulted from the outside light entering the main sensors 32. Such a relationship between the wavelength region of the detection light and the photosensitive wavelength regions respectively in the main sensors 32 and the auxiliary sensors 33 may be implemented by a combination of any existing color filters, design of the spectral sensitivity of the photoreception sensor, and others.

Herein, the photosensitive wavelength region of the main sensors 32 may be the one as indicated by a reference symbol G22 in FIG. 6(B), and similarly, the photosensitive wavelength region of the auxiliary sensors 33 may be the one as indicated by a reference symbol G32 in FIG. 6(C). If this is the case, the wavelength region $\Delta\lambda 12$ (wavelength region of wavelength of $\lambda 1$ to wavelength of $\lambda 2$) and the wavelength region $\Delta\lambda 34$ (wavelength region of wavelength of $\lambda 3$ to wavelength of $\lambda 4$) are to be the photosensitive wavelength region for both of the main sensors 32 and the auxiliary sensors 33.

Described next are the advantages and effects of the display-and-image-pickup device of the embodiment.

[Exemplary Basic Operation of Display-and-Image-Pickup Device]

First of all, described is the basic operation of this display-and-image-pickup device, that is, the image display operation and the object image pickup operation thereof.

With this display-and-image-pickup device, the display data provided by the application program execution section 11 is used as a basis to generate a display-use drive signal in the display drive circuit 12. By the resulting drive signal, the I/O display panel 20 is subjected to line-sequential display driving so that image display is performed. In addition, at this time, the backlight 15 is also driven by the display drive circuit 12 so that it is subjected to an turn-ON/OFF operation in synchronization with the I/O display panel 20.

Figure 7:
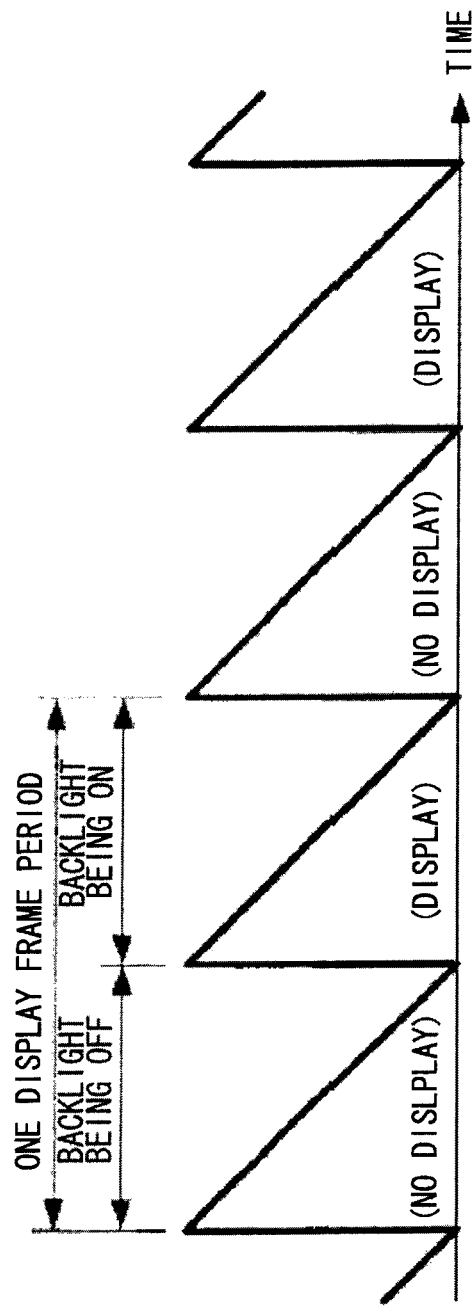
FIG. 7 is a timing chart for illustrating the relationship in terms of a backlight between the ON/OFF state and the display state thereof.

By referring to FIG. 7, described now is the relationship between the ON/OFF state of the backlight 15 and the display state of the I/O display panel 20. In FIG. 7, the lateral axis indicates the time, and the vertical axis indicates the vertical position of a line where the photoreceptors are driven for light reception.

First of all, when image display is being performed with a frame cycle of 1/60 seconds, for example, the backlight 15 is turned off (put in the OFF state) in the first half period (1/120 seconds) of each frame period, and thus no display is performed. On the other hand, in the second half period of each frame period, the backlight 15 is turned on (put in the ON state), and image display is performed for the corresponding frame period with a supply of a display signal to each pixel.

As such, the first half period of each frame period is a no-lighting period in which no irradiation light comes from the I/O display panel 20, but the second half period of each frame period is a lighting period in which irradiation light come from the I/O display panel 20.

Herein, when there is any proximity object (e.g., fingertip) to the I/O display panel 20, due to the line-sequential driving by the photoreception drive circuit 13 for light reception, this proximity object is subjected to image pick up by the photoreceptor of each pixel in this I/O display panel 20. The photoreception signal from each of the photoreceptors is then supplied to the photoreception drive circuit 13. In the photoreception drive circuit 13, the photoreception signals of the pixels in one frame are accumulated, and then are output to the image processing section 14 as a captured image.

Based on the resulting captured image, the image processing section 14 performs predetermined image processing (computation process) as will be described later, thereby detecting information about the proximity object to the I/O display panel 20 (position coordinates data, and data about object shape and size, for example).

[Exemplary Basic Operation of Fingertip Extraction Process (Differential Image Fingertip Extraction Process) in Display-and-Image-Pickup Device]

Figure 8:
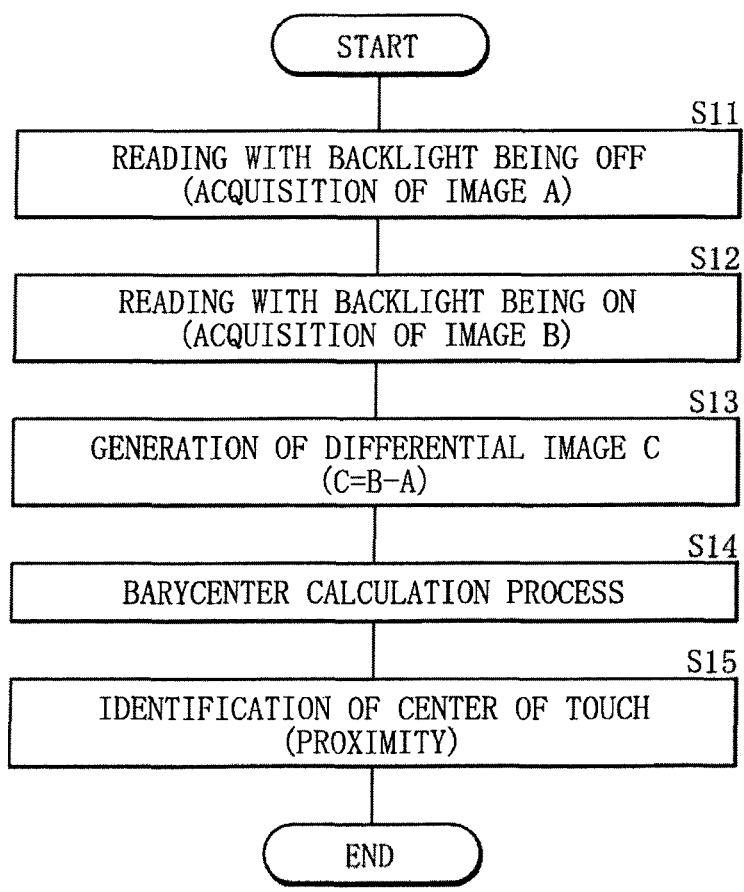
FIG. 8 is a flowchart of a differential image fingertip extraction process.

By referring to FIGS. 8 to 14, described next is the basic operation of a process of extracting any proximity object; e.g., fingertip) to the I/O display panel 20 by the image processing section 14 (fingertip extraction process). FIG. 8 is a flowchart of the fingertip extraction process (differential image fingertip extraction process that will be described later) by this image processing section 14, and FIG. 9 is a timing chart of a part of this differential image fingertip extraction process.

First of all, in the period being the first half period of one display frame period when the backlight 15 is OFF (no-lighting period), the I/O display panel 20 performs the image pickup process to the proximity object. As a result, an image A (shade image) is obtained (step S11 of FIG. 8, and period of timings t1 to t2 of FIG. 9).

Next, in the period being the second half period of the display frame period when the backlight 15 is ON (lighting period), the I/O display panel 20 performs the image pickup process to the proximity object. As a result, an image B (reflected-image-using image as a result of using the reflection light of irradiation light) is obtained (step S12 of FIG. 8, and period of timings t3 to t4 of FIG. 9).

Figure 9:
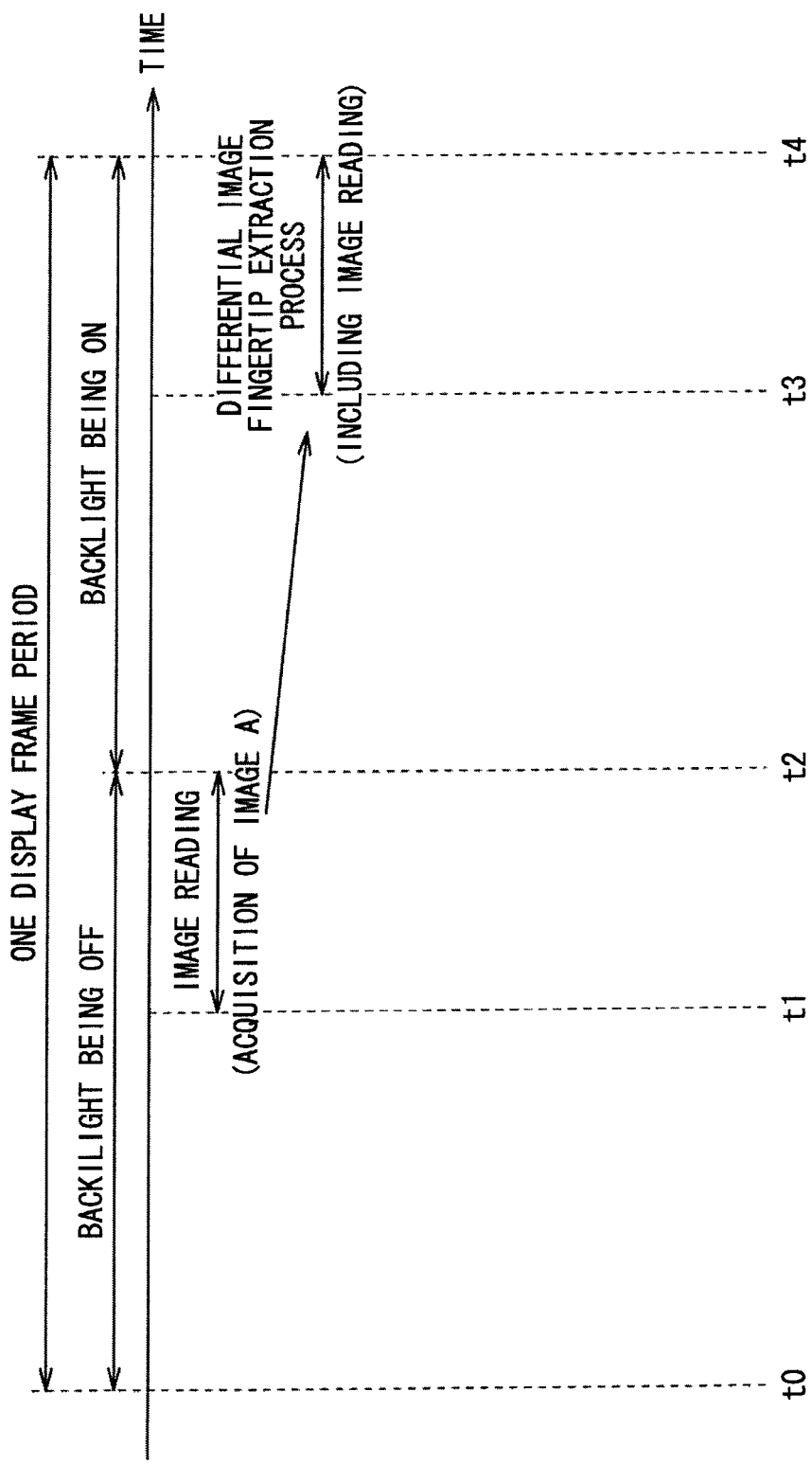
FIG. 9 is a timing chart for illustrating the differential image extraction process of FIG. 8.
Figure 10:
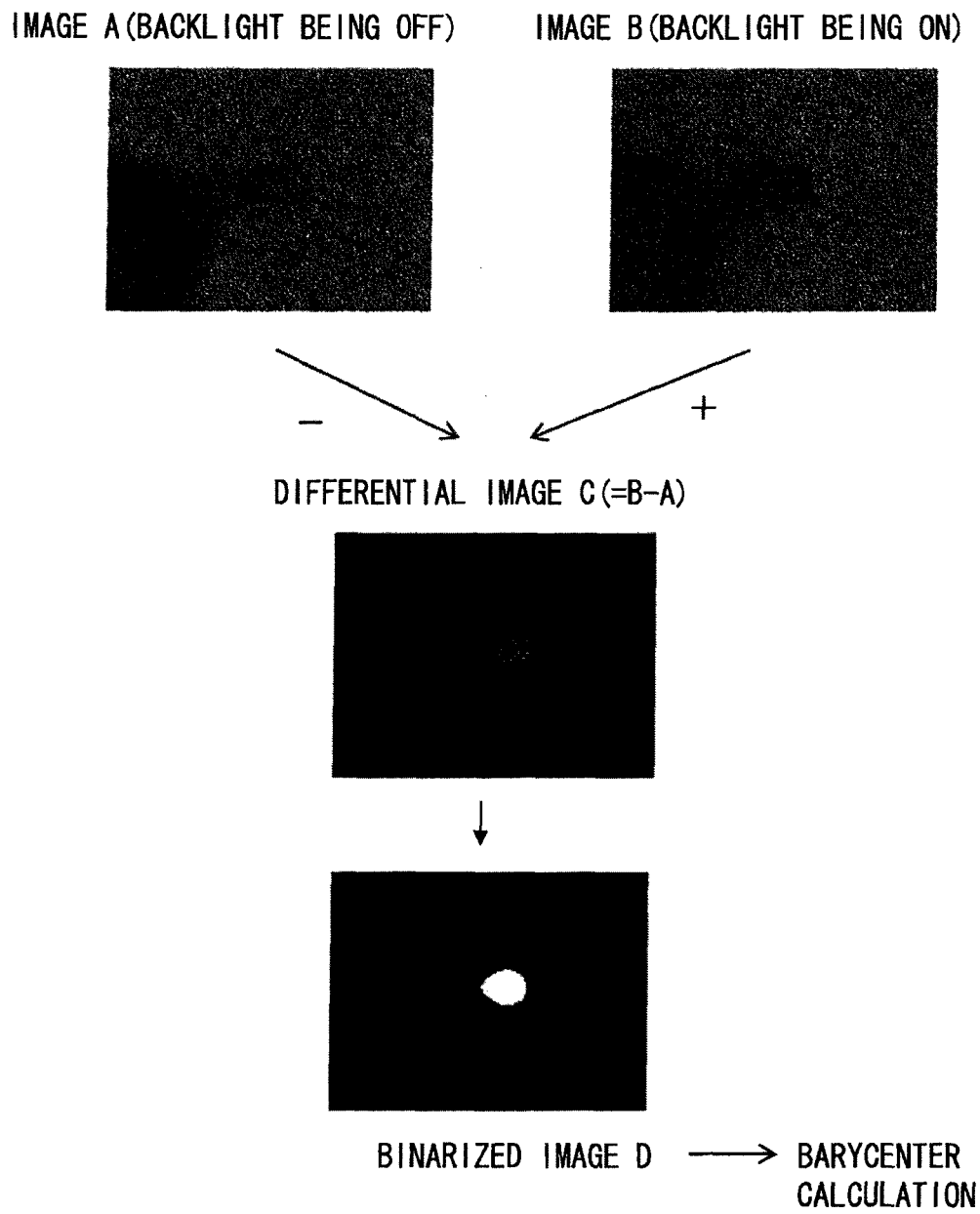
FIG. 10 is a photographic diagram for illustrating the differential image fingertip extraction process.

Next, using this image B and the image A (shade image) being the result of image pickup in the period when the backlight 15 is turned OFF (no-lighting period), the image processing section 14 generates a differential image C (step S13 of FIG. 8, and period of timings t3 to t4 of FIG. 9).

Next, the image processing section 14 uses thus generated differential image C as a basis to perform the computation process for barycenter determination (step S14), thereby identifying the center of touch (proximity) (step S15). Thereafter, the detection result about the proximity object is output to the application program execution section 11 from the image processing section 14, and this is the end of the differential image fingertip extraction process by the image processing section 14.

In such a manner, in the differential image fingertip extraction process, the fingertip extraction process is performed based on the differential image C obtained using the image B utilizing the reflection light of the irradiation light and the image A utilizing not the irradiation light but the outside light (ambient light). Accordingly, like an exemplary photo image of the differential image C of FIG. 10, any influence of the brightness of the outside light is removed, and with no influence of the brightness of the outside light as such, detection of the proximity object is performed. Moreover, at the same time as such removal of the outside light, any fixed noise resulted from characteristics variation of the light-emitting elements or others can be removed.

To be specific, as exemplarily shown by the cross-sectional view of FIG. 11(A), when the incident outside light is intense, a photoreception output voltage Von1 with the backlight 15 being in the ON state is to be like the one shown in FIG. 11(B). That is, at other than the portion touched by the finger, the voltage takes a value Va corresponding to the brightness of the outside light, and at the portion touched by the finger, on the surface of the object (finger) touched as such, the voltage is reduced to a value Vb corresponding to the reflectance of reflecting the light coming from the backlight 15. On the other hand, a photoreception output voltage Voff1 with the backlight 15 being in the OFF state is to similarly take the voltage value Va corresponding to the brightness of the outside light at other than the portion touched by the finger, but at the portion touched by the finger, the voltage takes a value Vc being considerably low in level because the outside light is being blocked.

Further, as shown by the cross-sectional view of FIG. 12(A), in the state where incident outside light is weak (little), a photoreception output voltage Von2 with the backlight 15 being in the ON state is to be like the one shown in FIG. 12(B). That is, at other than the portion touched by the finger, the voltage takes the value Vc being considerably low in level because there is no outside light. On the other hand, at the portion touched by the finger, on the surface touched by the object (finger) at that time, the voltage goes up to the value Vb corresponding to the reflectance of reflecting the light coming from the backlight 15. Whereas a photoreception output voltage Voff2 in the state with the backlight 15 being in the OFF state, the voltage remains at the value Vc being considerably low in level, and shows no change irrespective of whether the portion is touched by the finger or not.

Figure 11:
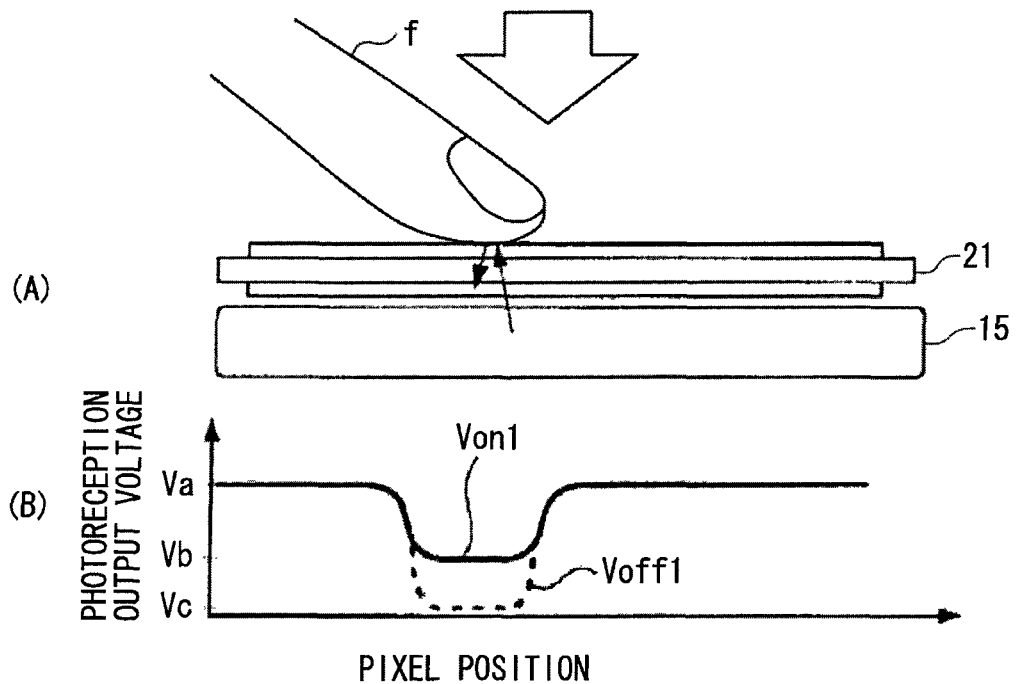
FIG. 11 is a diagram for illustrating the differential image fingertip extraction process when the outside light is bright.
Figure 12:
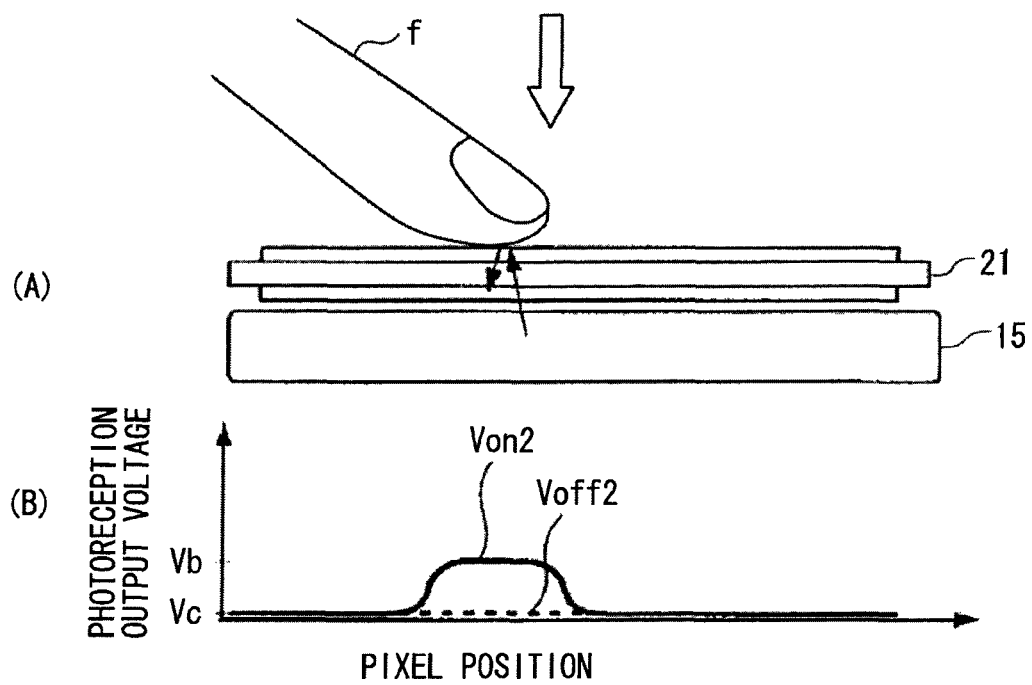
FIG. 12 is a diagram for illustrating the differential image fingertip extraction process when the outside light is dark.
Figure 13:
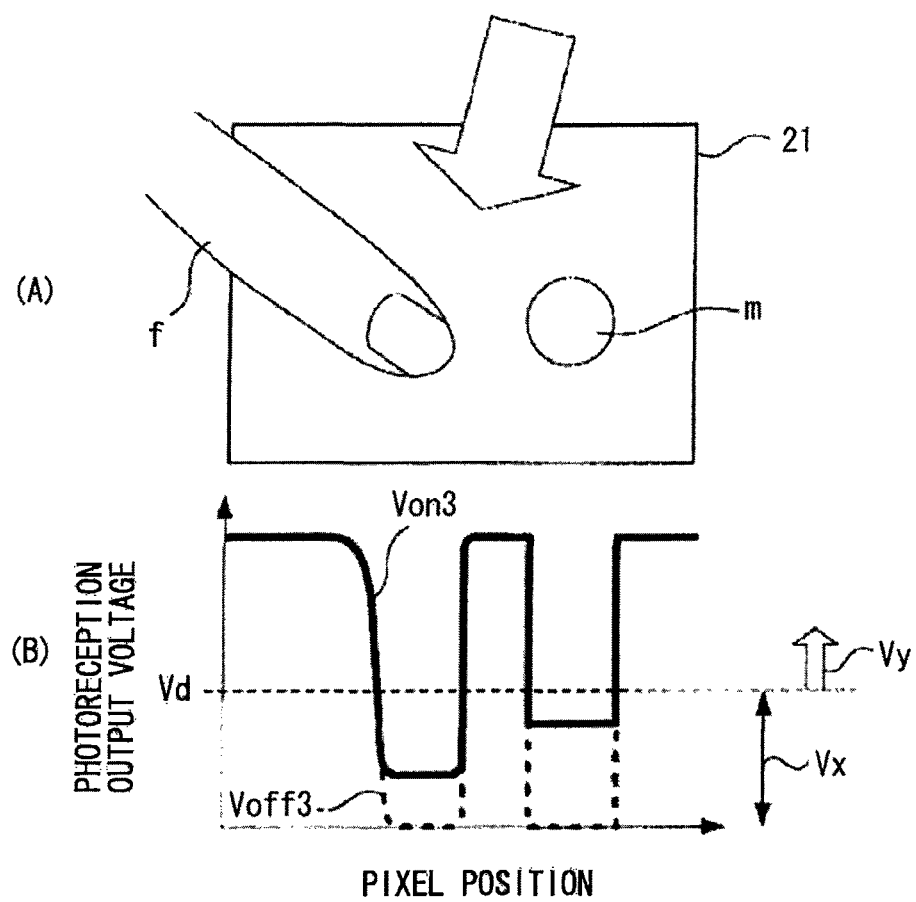
FIG. 13 is a diagram for illustrating the dynamic range of a photoreception signal as a result of the differential image fingertip extraction process.
Figure 14:
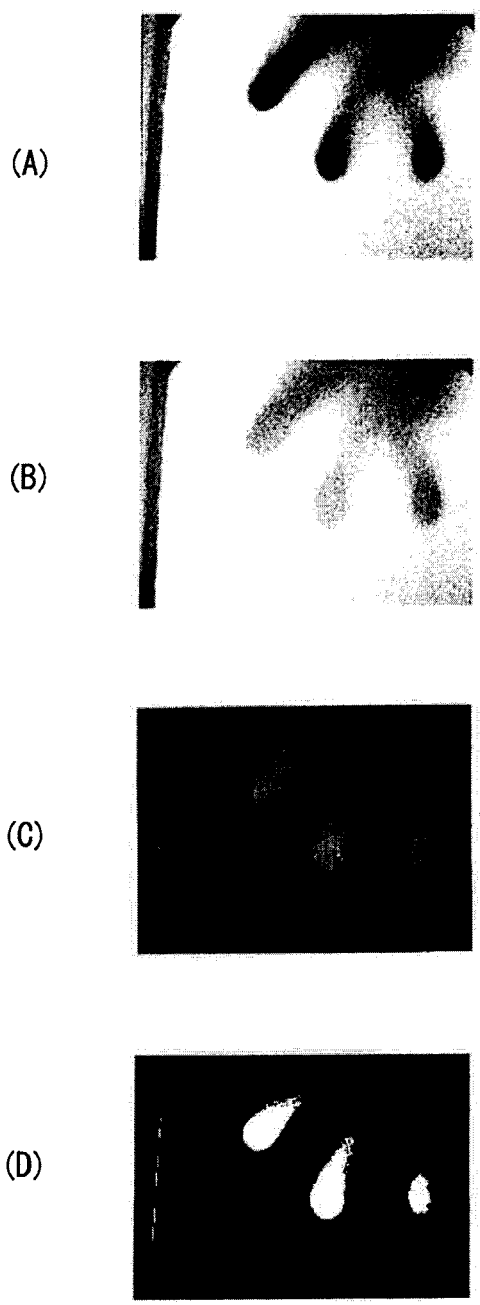
FIG. 14 is a photographic diagram for illustrating the differential image fingertip extraction process when a fingertip being a detection target exists plurally at the same time.

As such, as is evident from a comparison of FIGS. 11 and 12, at the portion not touching the display area 21 of the panel, the photoreception output voltage shows a big difference with and without the outside light. On the other hand, at the portion where the finger is touching, irrespective of whether there is the outside light or not, the voltage value Vb with the backlight 15 being turned ON is almost in the same state as the voltage value Vc with the backlight 15 being turned OFF.

Accordingly, detection is performed to find any difference between the voltage when the backlight 15 is turned ON and the voltage when it is turned OFF, and like a difference between the voltage value Vb and the voltage value Vc, any portion showing a difference of a certain value or more can be determined as being the portion being in touch with or being close to the panel. As such, even if the outside light entering the panel is intense, and even if there is little outside light, detection of touching or proximity can be performed satisfactorily under consistent conditions.

Further, as shown in FIGS. 13(A) and (B), the dynamic range needed for detection of the photoreception output voltage is determined as below. Herein, FIG. 13(A) shows the state of touching of the display area 21 of the panel, and in the state, the panel surface is touched by a finger f, and a round object m with the reflectance of almost 100% is placed on the display area 21. In such a state, the photoreception output voltage of a line of scanning both the finger f and the object m will be in the state of FIG. 13(B). Moreover, in FIG. 13(B), a voltage Von3 is the photoreception output voltage in the state with the backlight 15 being turned ON, and a voltage Voff3 is the photoreception output voltage in the state with the backlight 15 being turned OFF.

As shown in FIG. 13(B), at the portion where there is the object m with the reflectance of almost 100%, the voltage higher than a voltage Vd to be detected when the backlight 15 is turned ON is at a no-observation-necessary level Vy, and a range Vx equal to or lower than the level is the dynamic range needed for the detection. This thus tells that any signals at the no-observation-required level Vy may be all regarded as having the same intensity with overflow.

Note that, in this differential image fingertip extraction process, images of FIGS. 14(A) to (D) (the images A to C and binary image of the image C) tell the below, for example. That is, for a plurality of proximity objects disposed on the display area 21 of the I/O display panel 20, information can be acquired about the position, shape, or size of each of the proximal objects, for example.

[Example of Differential Image Fingertip Extraction Process When Proximity Object is Moving]

By referring to FIGS. 15 to 21, described next is one specific feature of the invention, i.e., the differential image fingertip extraction process when a proximity object is moving or the like, with a comparison with a comparison example.

Figure 15:
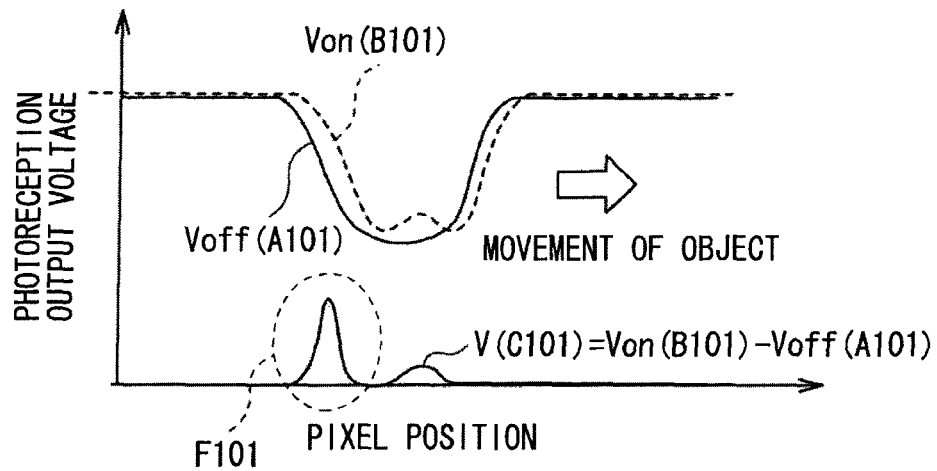
FIG. 15 is a characteristics diagram for illustrating a differential image extraction process of a comparison example.
Figure 16:
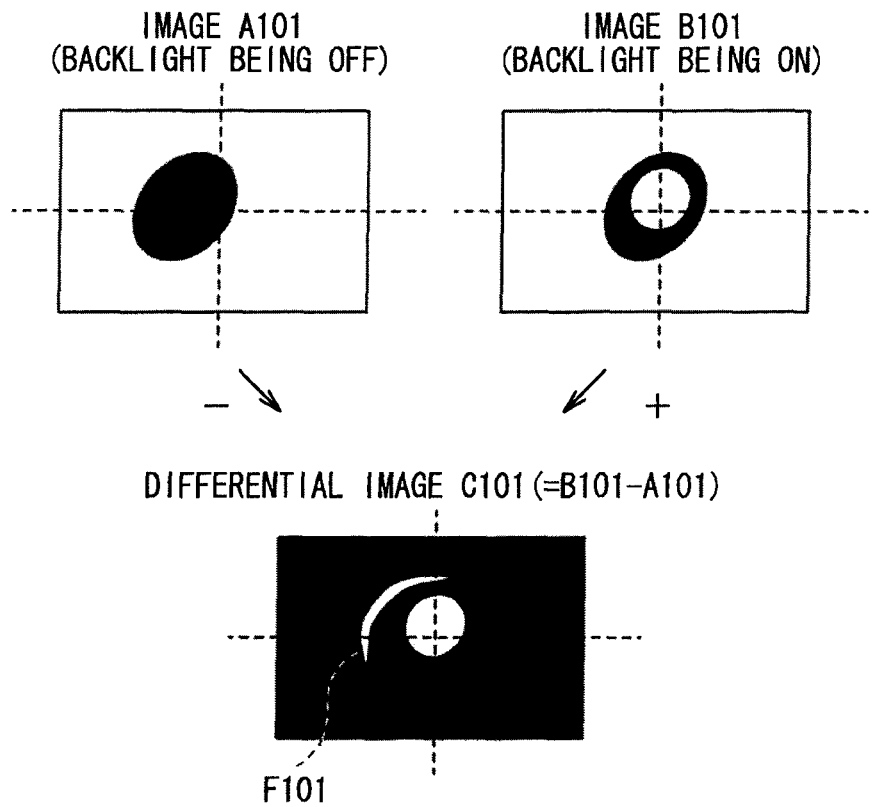
FIG. 16 is a schematic diagram for illustrating the differential image extraction process of the comparison example.

First of all, with a comparison example of FIGS. 15 and 16, as indicated by an arrow in FIG. 15, the following problem is observed when a proximity object is in the moving state on the display area 21 of the I/O display panel 20. That is, positional displacement is observed at any portion corresponding to the proximity object between a photoreception output signal Voff (A101) in a shade image A101 and a photoreception output signal Von (B101) in a reflection-light-utilized image B101. Further, due to such a position, in a differential image C101 of these two images A101 and B101 (=B101−A101), and in a photoreception detection signal V (C101) thereof (=Von(B101)−Voff(A101)), in addition to an originally-expected signal corresponding to the position of the object, a false signal F101 is generated at another different position. As a result, the existence of such a false signal F101 causes a difficulty in detecting the proximal object with a good stability.

Whereas, in the embodiment, the image processing section 14 acquires object information about the proximity object with use of a composite image based on a captured image obtained by the main sensors 32 and a captured image obtained by the auxiliary sensors 33. To be specific, the photoreception drive circuit 13 generates a differential image C (=B−A) of the reflection-light-utilized image B and the shade image A specifically for each type of the main sensors 32 and the auxiliary sensors 33. The image processing section 14 then acquires the object information with use of a composite image F based on a differential image MC of a reflection-light-utilized image MB and a shade image MA both obtained by the main sensors 32 (=MB−MA; first differential image), and a differential image HC of a reflection-light-utilized image HB and a shade image HA both obtained by the auxiliary sensors 33 (=HB−HA; second differential image).

Figure 17:
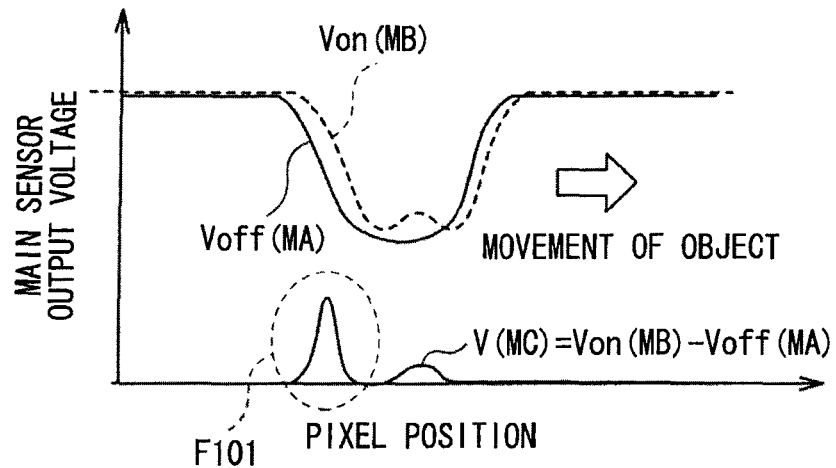
FIG. 17 is a characteristics diagram for illustrating a differential image in the main sensors of the embodiment.
Figure 18:
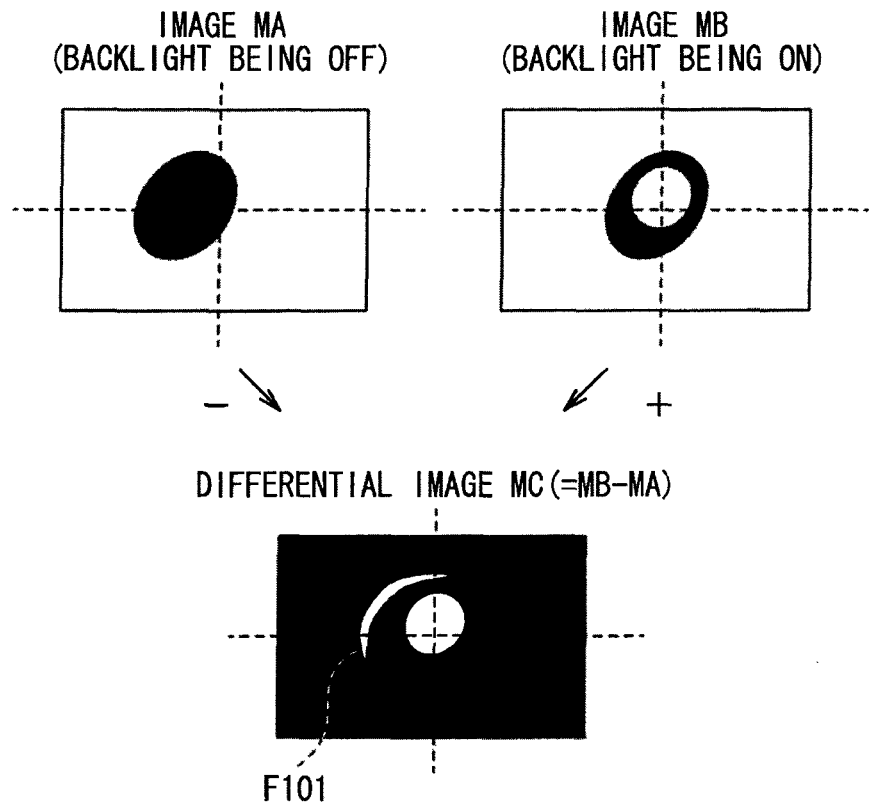
FIG. 18 is a schematic diagram for illustrating the differential image in the main sensors of the embodiment.

To be more specific, with the captured image obtained by the main sensors 32, the differential image MC is generated as shown in FIGS. 17 and 18, for example. That is, in the main sensors 32, because the wavelength region Δλ23 of detection light is included in the photosensitive wavelength region thereof, when the proximity object is moving on the display area 21 of the I/O display panel 20, for example, in the differential image MC, the false signal F101 is generated in addition to a detection signal of the proximity object similarly to the comparison example. In other words, in the differential image MC of the images MA and MB (=MB−MA), and in the photoreception detection signal V(MC) thereof (=Von(MB)−Voff(MA)), in addition to an originally-expected signal corresponding to the position of the object, the false signal F101 is generated at another different position.

Figure 19:
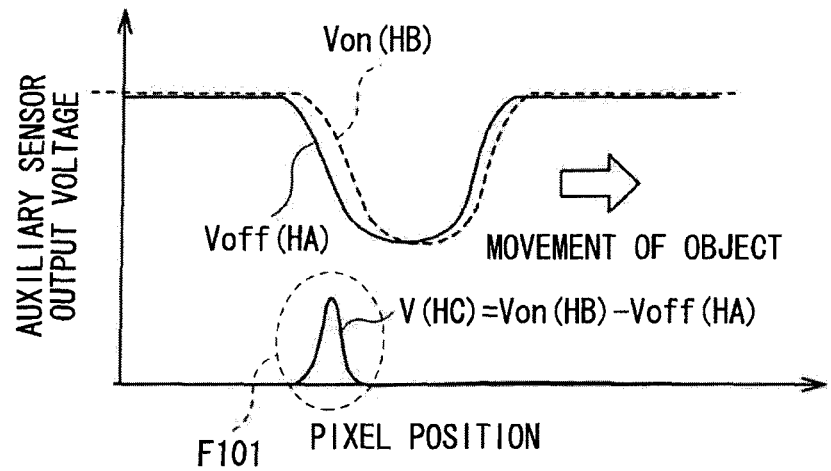
FIG. 19 is a characteristics diagram for illustrating a differential image in the auxiliary sensors of the embodiment.
Figure 20:
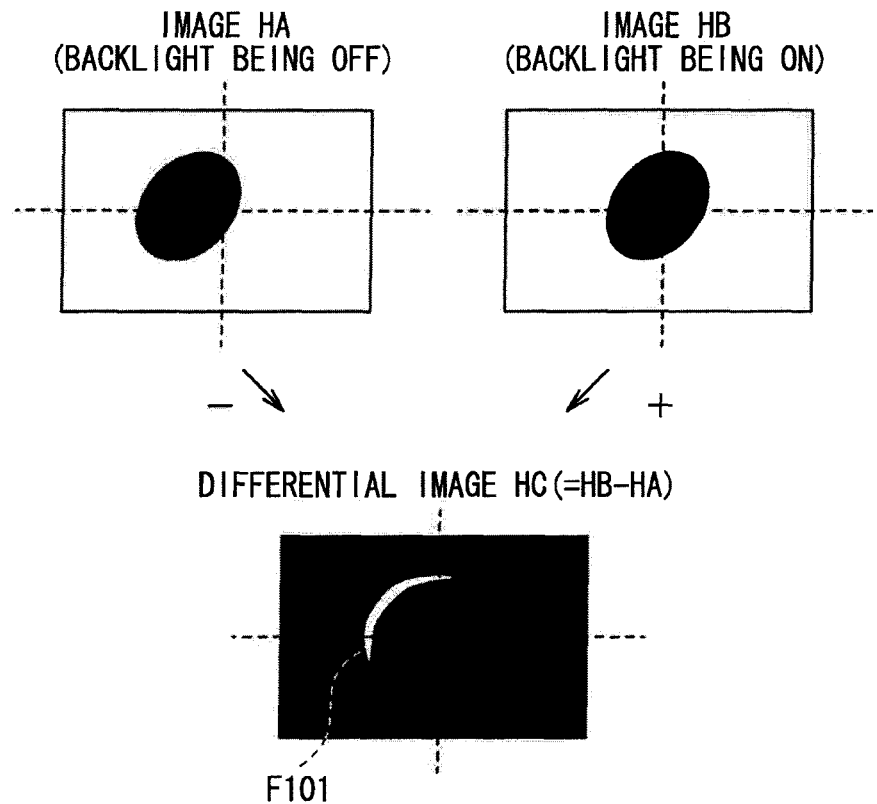
FIG. 20 is a schematic diagram for illustrating the differential image in the auxiliary sensors of the embodiment.

On the other hand, with the captured image obtained by the auxiliary sensors 33, the differential image HC is generated as shown in FIGS. 19 and 20, for example. That is, in each of the auxiliary sensors 33, the photosensitivity in the wavelength region of detection light is lower than that of the first photoreceptors (0 in this example). Therefore, similarly to the case with the main sensors 32, the false signal F101 is generated in the differential image HC, but a detection signal of the proximity object can be prevented from being generated (avoided in this example). In other words, although the false signal F101 is generated in the differential image HC of the images HA and HB (=HB−HA) and in the photoreception detection signal V(HC) thereof (=Von(HB)−Voff(HA)), an originally-expected signal corresponding to the position of the object can be prevented from being generated (avoided in this example).

Figure 21:
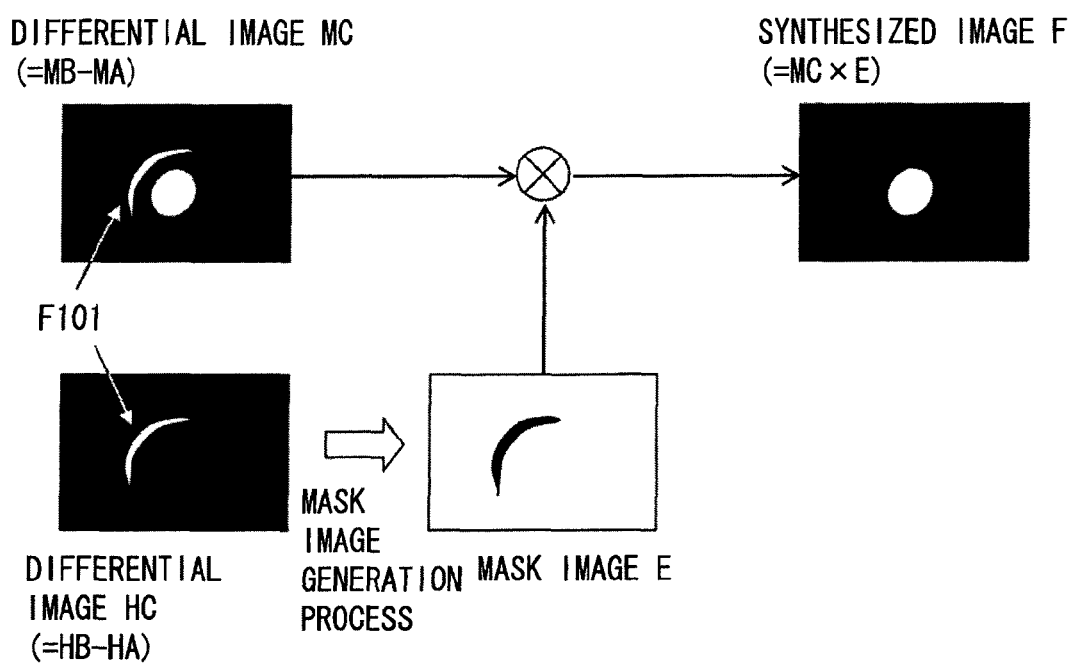
FIG. 21 is a schematic diagram for illustrating a synthesis process to be performed to the differential image in the main sensors and the differential image in the auxiliary sensors of the embodiment.

Next, as exemplarily shown in FIG. 21, the photoreception drive circuit 13 generates a predetermined mask image E based on the differential image HC obtained by the auxiliary sensors 33. Further, the photoreception drive circuit 13 takes AND of the differential image MC obtained by the main sensors 32 and the generated mask image E, thereby generating a composite image F thereof. Using the resulting composite image F, the image processing section 14 then acquires object information about the proximal object. At this time, the photoreception drive circuit 13 applies a binarization process and an image reversal process, for example, to the differential image HC, thereby being able to generate the mask image E. To be specific, with the binarization process, any photoreception signal of a value (threshold value) or larger in the differential image HC may be regarded as a false signal, and may be converted into an image of masking the portion of the false signal.

Herein, the reason for handling any signal of a threshold value or larger as a false signal is to eliminate the influence of noise on the panel, and to be ready for a detection signal to appear slightly in the differential image HC on the auxiliary sensors 33 side because some auxiliary sensor 33 may have the performance capabilities not good enough to completely separate the spectral characteristics. Therefore, minimizing such a leak of detection signal to the auxiliary sensors 33 leads to the improvement of the performance capabilities of the system. To be specific, restricting the wavelength region Δλ23 of the detection light will do, and for the auxiliary sensors 33, designing the sensitivity as low as possible with respect to the wavelength region Δλ of the detection light will do. Herein, because the auxiliary sensors 33 are each in charge of detecting any false signal to be generated by the outside light, the performance capabilities thereof can be improved by increasing the sensitivity thereof to the outside light to be relatively higher than the wavelength sensitivity of the detection light.

Alternatively, other than the method of generating the composite image F using such a mask image E, the differential image of the differential image MC and the differential image HC (=MC−HC) may be used as the composite image F.

In such a manner, with use of the composite image F obtained based on the differential image MC obtained by the main sensors 32 and the differential image HC obtained by the auxiliary sensors 33, the object information is acquired. As such, even a case where a proximity object is moving on the display area 21 of the I/O display panel 20, for example, a false signal can be prevented from being generated (or avoided) in the composite image F.

As described in the foregoing, in the embodiment, the display area 21 of the I/O display panel 20 is provided therein with a plurality of main sensors 32, each of which includes, as a photosensitive wavelength region, the wavelength region $\Delta\lambda 23$ of detection light for use to detect a proximity object. Also provided are a plurality of auxiliary sensors 33 in each of which the photosensitivity in the wavelength region of the detection light is lower than that in the main sensors 32. Further, with use of the composite image F obtained based on the differential image MC obtained by the main sensors 32 and the differential image HC obtained by the auxiliary sensors 33, the object information about the proximity object is to be acquired. Accordingly, even when the proximity object is moving on the display area 21 of the I/O display panel 20, for example, any false signal is prevented from being generated in the composite image F, thereby enabling to detect the object with a good stability no matter in what use conditions. What is more, every type of false signal generation pattern can be handled in principle, thereby enabling the operation satisfactorily under every type of outside light conditions.

In the below, a description will be given with several modified examples of the invention. Note that any component same as that in the embodiment described above is provided with the same reference symbol, and is not described again if appropriate.

First Modified Example

Figure 22:
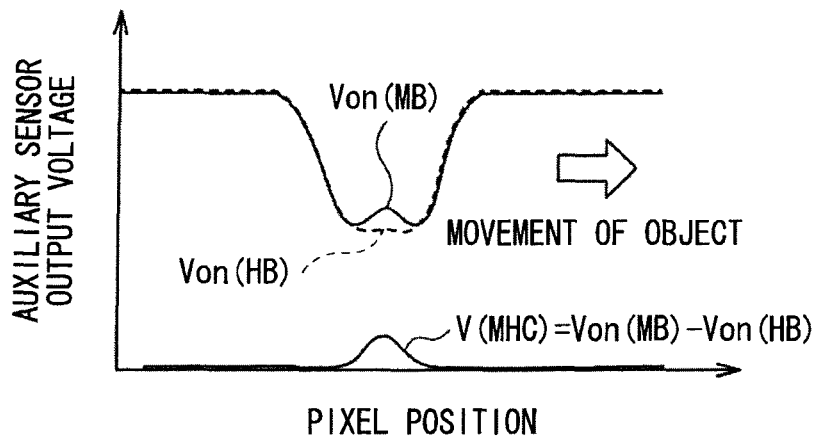
FIG. 22 is a characteristics diagram for illustrating a differential image fingertip extraction process of a first modified example of the invention.
Figure 23:
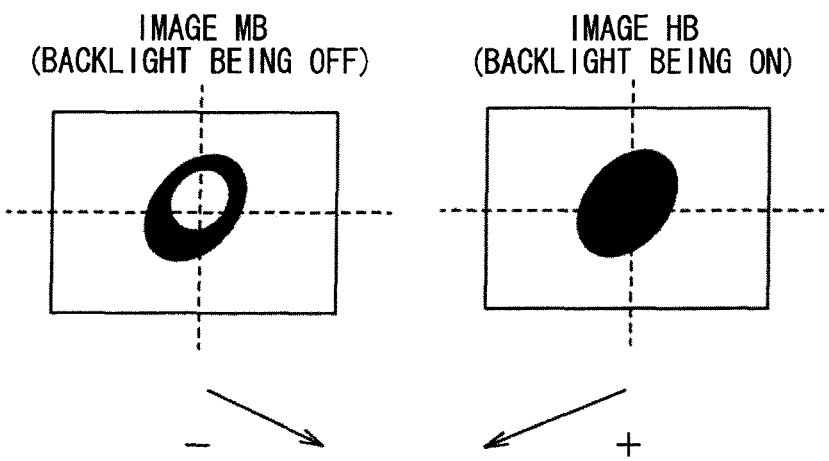
FIG. 23 is a schematic diagram for illustrating the differential image fingertip extraction process of the first modified example of the invention.
Figure 23:
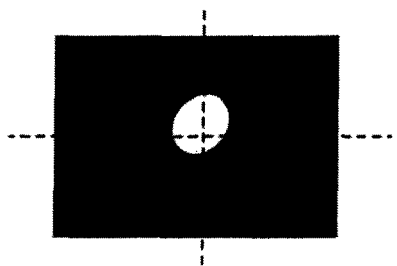

FIGS. 22 and 23 each show a differential image fingertip extraction process of a first modified example.

In this modified example, as exemplarily shown in FIGS. 22 and 23, the photoreception drive circuit 13 acquires object information based on a differential image MHC of the reflection-light-utilized image MB obtained by the main sensors 32 and the reflection-light-utilized image HB obtained by the auxiliary sensor 33 (=MB−HB).

This enables to detect any object with a good stability no matter in what use conditions similarly to the embodiment described above.

Second Modified Example

Figure 24:
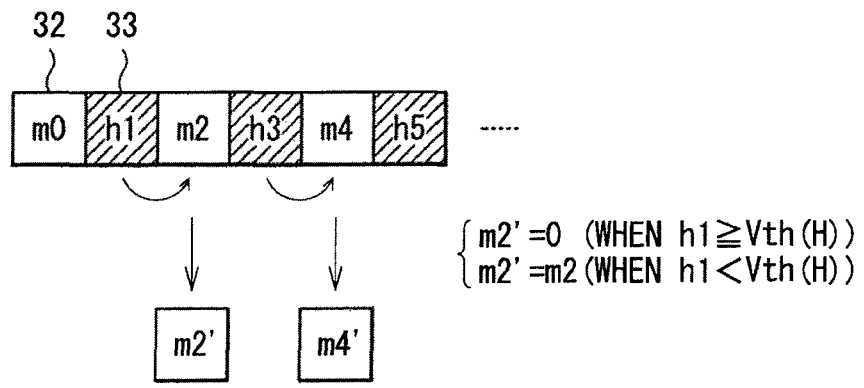
FIG. 24 is a schematic diagram for illustrating a differential image fingertip extraction process of a second modified example of the invention.

FIG. 24 shows a differential image fingertip extraction process in a second modified example. In this modified example, the image processing section 14 is so configured as to perform, by sequential processing, the process of generating the differential image MC and the process of generating the differential image HC for the main sensor 32 and the auxiliary sensor 33, respectively.

To be specific, in this modified example, as shown in FIG. 24, on the display area 21, the main sensors 32 and the auxiliary sensors 33 are disposed alternately with the one-to-one ratio. Moreover, the differential image MC and the differential image HC are respectively configured by a plurality of differential pixel values of m0, h1, m2, h3, m4, h5, and the like.

Then, for the sequential processing described above, when the differential pixel value acquired by an auxiliary sensor 33 adjacent to a main sensor 32 is equal to or larger than a predetermined threshold value Vth(H), the photoreception drive circuit 13 determines that the main sensor 32 has the differential pixel value of 0 (zero), and outputs the value.

On the other hand, when the differential pixel value acquired by an auxiliary sensors 33 adjacent to a main sensor 32 is smaller than the above threshold value Vth(H), the actual result of the differential computation derived by the main sensor 32 is output as a differential pixel value. In this manner, the process to be performed becomes equivalent to the mask process with use of the mask image E described in the embodiment above.

As such, in this modified example, the processing result can be acquired with no need for specifically including a frame memory for use with the auxiliary sensors 33 and the main sensors 32, and can be acquired at high speed.

Third Modified Example

Figure 25:
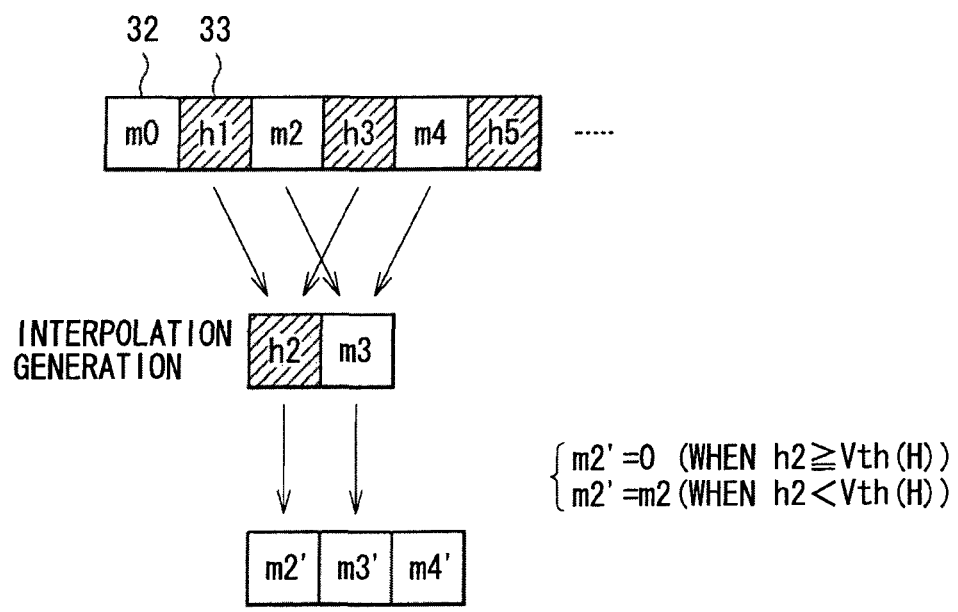
FIG. 25 is a schematic diagram for illustrating a differential image fingertip extraction process of a third modified example of the invention.
Figure 26:
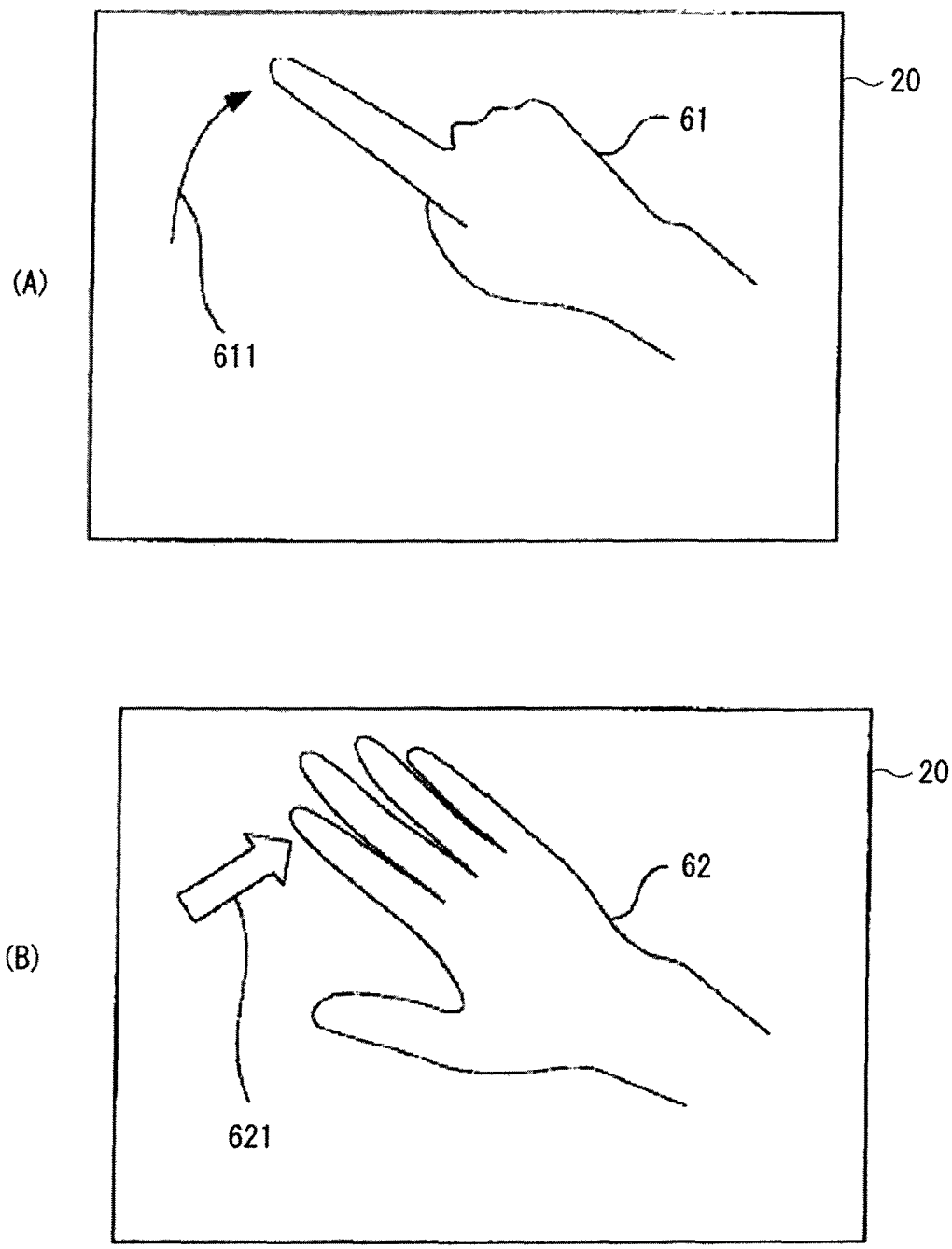
FIG. 26 is a diagram for illustrating an exemplary application utilizing the result of the fingertip extraction process.

FIG. 25 shows a differential image fingertip extraction process of a third modified example. In this modified example, in order to actually acquire the result with a higher precision, the process of the second modified example is to be performed with an interpolation process for both sides of the auxiliary sensors 33 and the main sensors 32.

To be specific, for the sequential processing described above, the photoreception drive circuit 13 generates and interpolates a differential pixel value for each of the main sensors 32 located at the respective positions corresponding to the auxiliary sensors 33. A differential pixel value is also generated and interpolated for each of the auxiliary sensors 33 located at the respective positions corresponding to the main sensors 32. Considering also the differential pixel values generated and interpolated as such, the sequential processing is to be executed in accordance with the result of comparison with the threshold value.

This accordingly establishes a correlation with a good accuracy between the auxiliary sensors and the main sensors so that the processing result can be ideal. Also with such a method, there is no specific need to include a frame memory but only to have in advance the processing result about one or two sensors. Moreover, because the processing is executed on a sensor basis, any delay to be caused by the processing remains within a range related to a few sensors so that the processing can be executed at extremely high speed.

Note that, in this modified example, as exemplarily shown in FIGS. 4(A) and (B), the main sensors 32 and the auxiliary sensors 33 are preferably disposed alternately with the one-to-one ratio on the display area 21.

(Execution Example of Application Program)

By referring to FIGS. 26 to 29, described next are several execution examples of an application program by the application program execution section 11 utilizing information about the position of an object or others detected by the fingertip extraction process described in the foregoing.

First of all, an example illustrated in FIG. 26(A) is an example in which a fingertip 61 touches the surface of the I/O display panel 20, and the path of touch is displayed on the screen as a drawing line 611.

Further, an example illustrated in FIG. 26(B) is about gesture recognition using the shape of a hand. To be specific, the shape of a hand 62 touching (or coming closer to) the I/O display panel 20 is recognized, and the recognized shape of the hand is displayed as an image. In response to a moving operation 621 of such a display object, the process of some type is to be performed.

Figure 27:
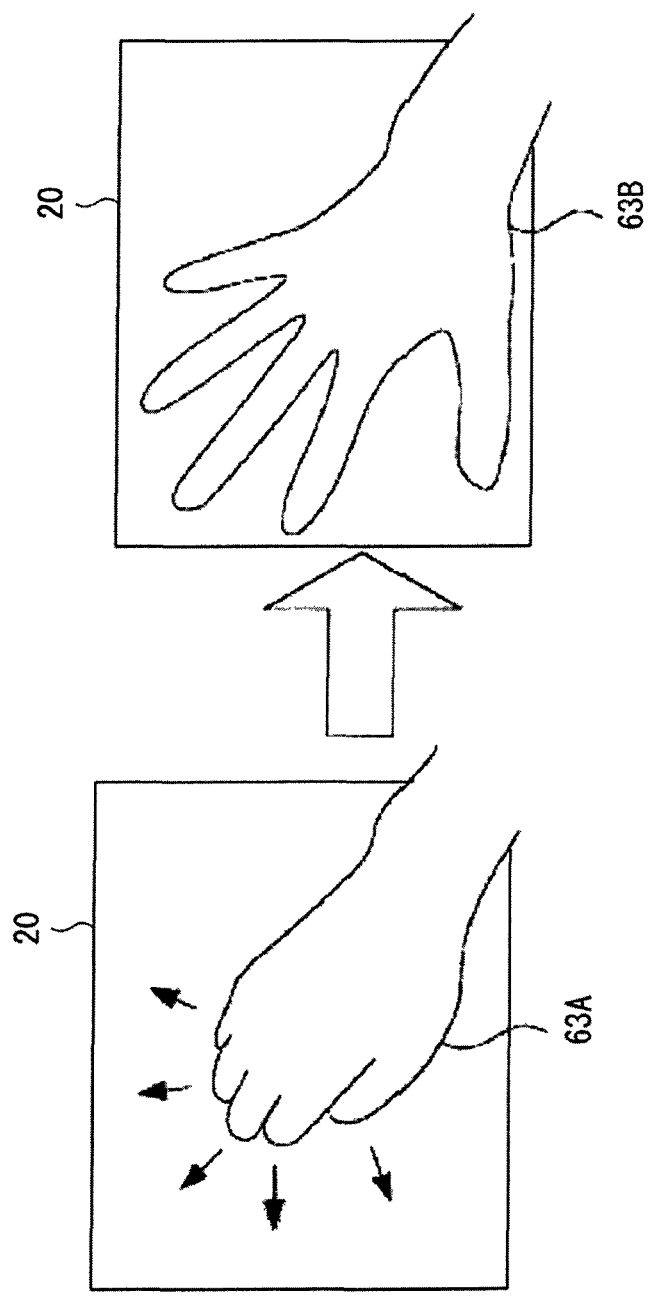
FIG. 27 is a diagram for illustrating exemplary application utilizing the result of the fingertip extraction process.

Still further, an example illustrated in FIG. 27 is about image recognition by changing the state of hand from a closed hand 63A to an open hand 63B, and subjecting the hands in the respective states to image recognition on the I/O display panel 20 in terms of touching or proximity. The process is to be performed based on the image recognition as such. Performing the process based on the recognition as such enables to issue a command for zooming in, for example. Further, with the possibility of such a command, by performing the image recognition as such, through a connection of a personal computer device to the I/O display panel 20, for example, the operation of command change or others on the computer device can be input in a more natural state.

Figure 28:
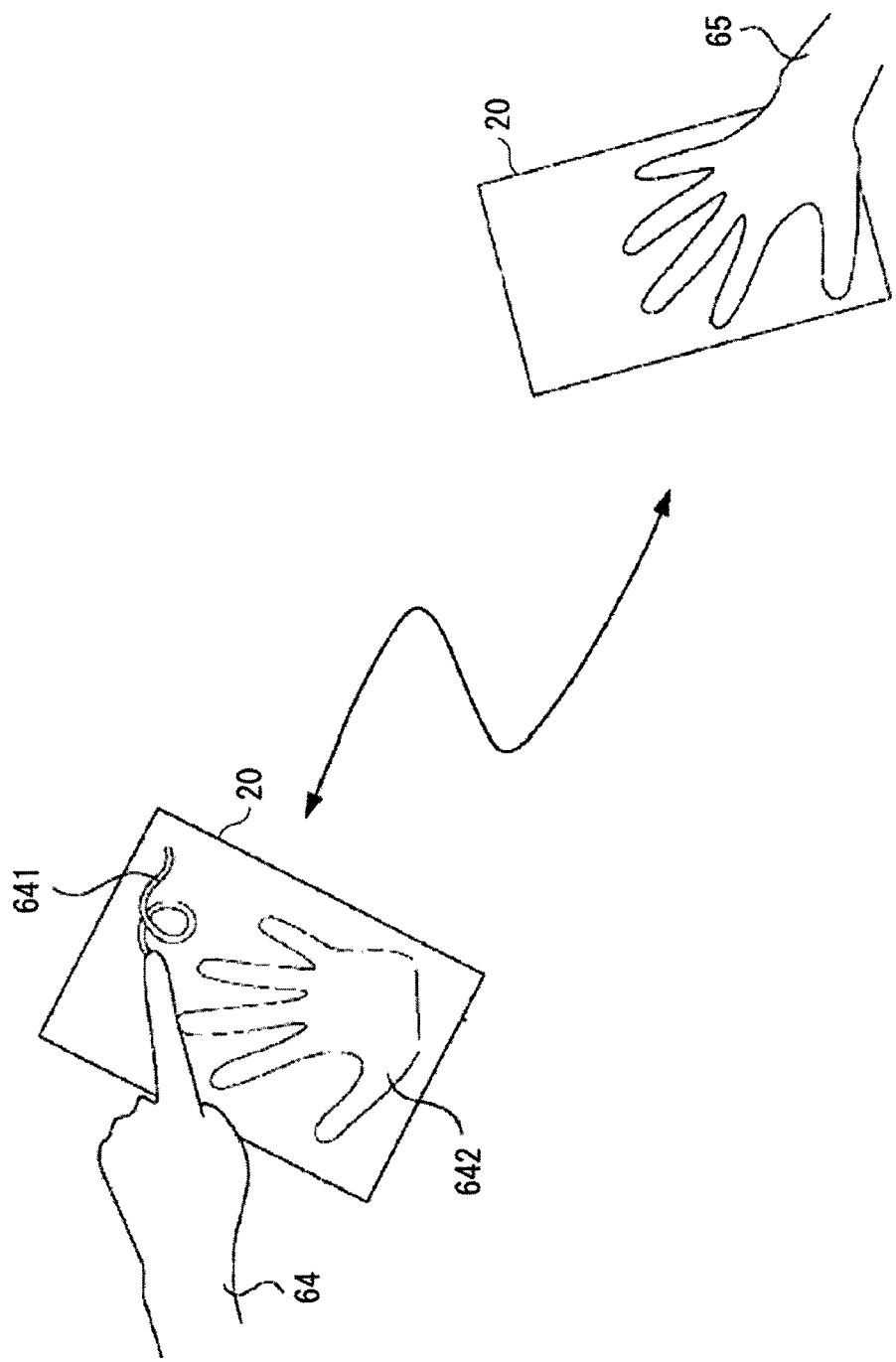
FIG. 28 is a diagram for illustrating exemplary application utilizing the result of the fingertip extraction process.

Alternatively, as exemplarily shown in FIG. 28, the I/O display panel 20 may be plurally provided, and such a plurality of I/O display panels 20 may be connected together by some type of transmission means. Then any image being the detection result of touching or proximity may be transmitted to any of the other I/O display panels 20 for display thereon to establish communications between users operating these display panels. That is, with the two I/O display panels 20 made ready, such a process of transmitting the shape of a hand 65 completed with image recognition on one of the panels to the remaining panel for displaying the shape of a hand 642 thereon, or a process of transmitting a path 641 displayed after the remaining panel is touched by a hand 64 to the other panel for display thereon, for example, is possibly performed. As such, there is a possibility of a new communication tool by transmitting moving images of any drawing state, and by forwarding any handwritten text, graphics, and others to a user on the other end. Such an example may include an application of the I/O display panel 20 to a display panel of a mobile phone terminal, for example.

Figure 29:
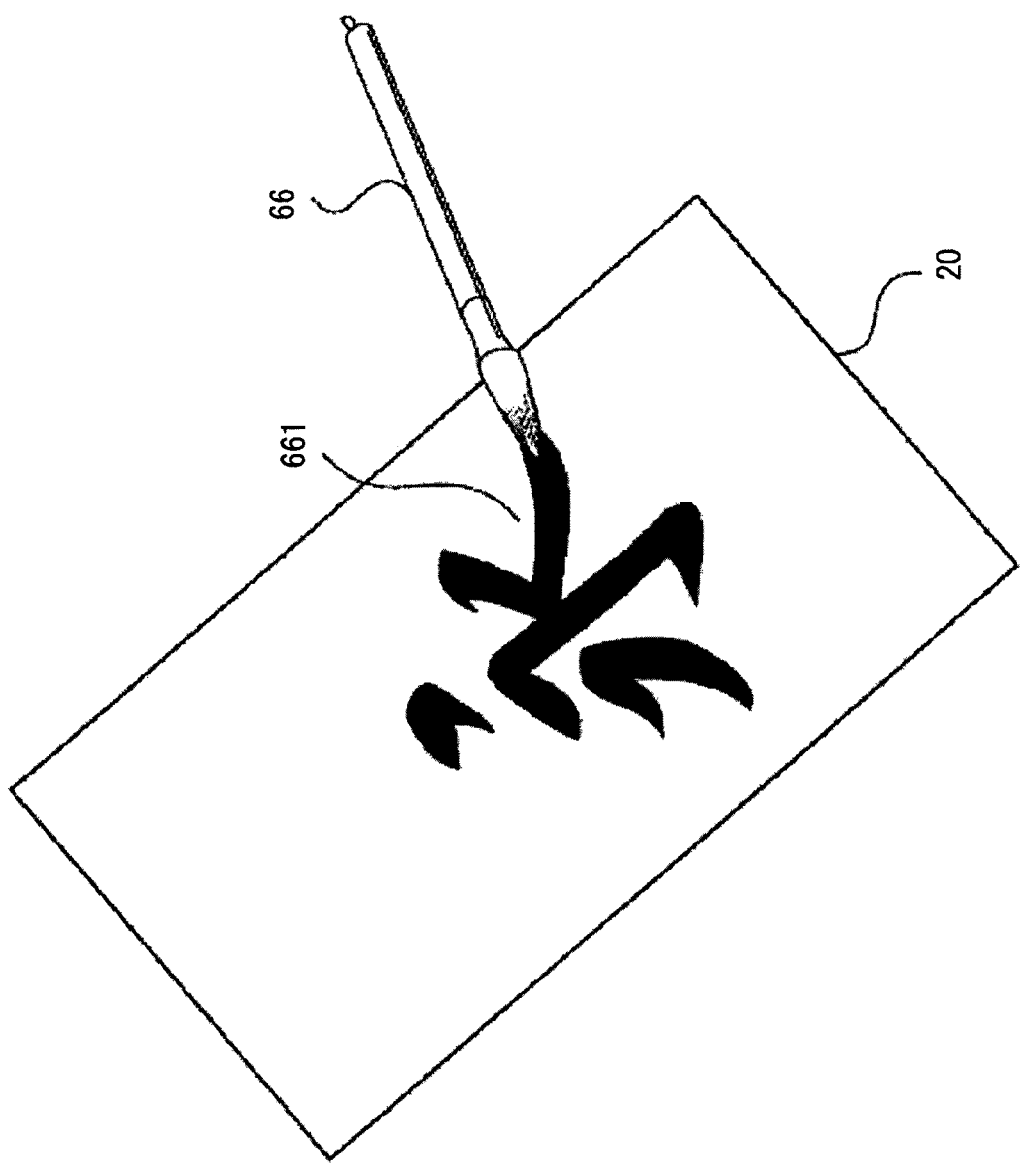
FIG. 29 is a diagram for illustrating exemplary application utilizing the result of the fingertip extraction process.

Still further, as exemplarily shown in FIG. 29, any handwriting input can be made by a brush pen by touching the surface of the I/O display panel 20 using a brush pen 66 like writing any text thereon, and by displaying the portion touched by the brush pen 66 as an image 661 on the I/O display panel 20. If this is the case, the detailed touch by the brush pen can be recognized and implemented. With the previous handwriting recognition, some specific types of digitizer has implemented electric field detection of any tilt of a special pen, for example, but in this example, the surface itself touched by a real brush pen is detected so that an information input can be made with more reality.

MODULE AND APPLICATION EXAMPLES

By referring to FIGS. 30 to 34, described next is application examples of the display-and-image-pickup devices described in the embodiment and the modified examples above. The display-and-image-pickup devices of the above embodiment and others can be applied to electronic devices of all types of field, including a television device, a digital camera, a notebook personal computer, a mobile terminal device exemplified by mobile phone, or a video camera. In other words, the display-and-image-pickup devices of the above embodiment and others can be applied to electronic devices of all types of field, whatever type of device displaying an externally-input video signal or an internally-generated video signal as an image or a video. Herein, the following examples of electronic devices are not the only possibilities, and an application example of a surveillance camera is also a possibility by utilizing such features of the invention as extracting only any reflected component by detection light, for example.

First Application Example

Figure 30:
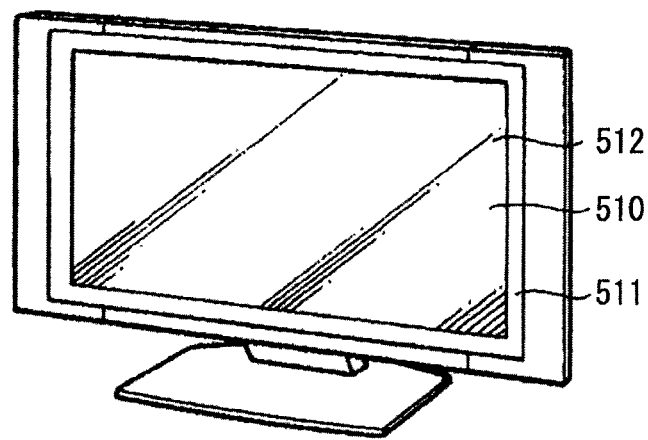
FIG. 30 is a perspective view of the display-and-image-pickup device of each of the embodiments above, showing the external appearance thereof in a first application example.

FIG. 30 shows the external appearance of a television device to which any of the display-and-image-pickup devices of the above embodiment and others is applied. This television device is configured to include a video display screen section 510 including a front panel 511 and a filter glass 512, for example, and this video display screen section 510 is configured by any of the display-and-image-pickup devices of the above embodiment and others.

Second Application Example

Figure 31:
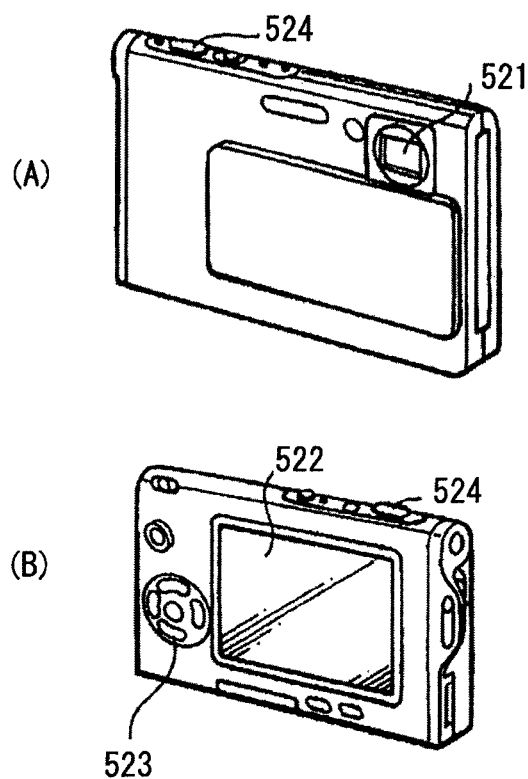
FIG. 31(A) is a perspective view in a second application example, showing the external appearance thereof when it is viewed from the front side, and (B) is a perspective view therein, showing the external appearance thereof when it is viewed from the rear side.

FIG. 31 shows the external appearance of a digital camera to which any of the display-and-image-pickup devices of the above embodiment and others is applied. This digital camera is configured to include a light-emission section 521 for flash use, a display section 522, a menu switch 523, and a shutter button 524, for example, and the display section 522 is configured by any of the display-and-image-pickup devices of the above embodiment and others.

Third Application Example

Figure 32:
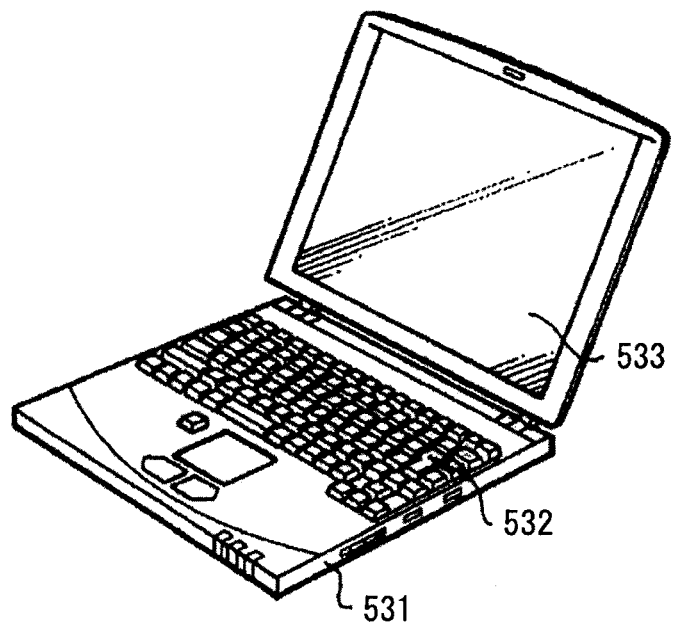
FIG. 32 is a perspective view in a third application example, showing the external appearance thereof.

FIG. 32 shows the external appearance of a notebook personal computer to which any of the display-and-image-pickup devices of the above embodiment and others is applied. This notebook personal computer is configured to include a main body 531, a keyboard 532 for an input operation of text or others, and a display section 533 for image display, for example, and the display section 533 is configured by any of the display-and-image-pickup devices of the above embodiment and others.

Fourth Application Example

Figure 33:
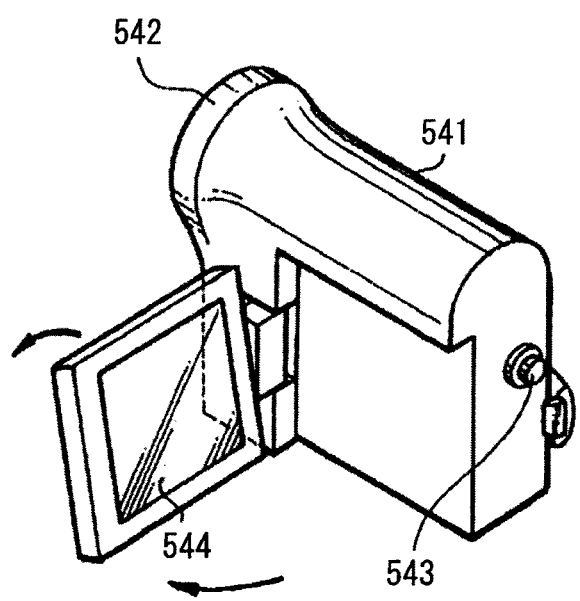
FIG. 33 is a perspective view in a fourth application example, showing the external appearance thereof.

FIG. 33 shows the external appearance of a video camera to which any of the display-and-image-pickup devices of the above embodiment and others is applied. This video camera is configured to include a body section 541, a lens 542 disposed on the front side surface of the body section 541 for object imaging use, a start/stop switch 543 for use at the time of image pickuup, and a display section 544, for example. This display section 544 is configured by any of the display-and-image-pickup devices of the above embodiment and others.

Fifth Application Example

Figure 34:
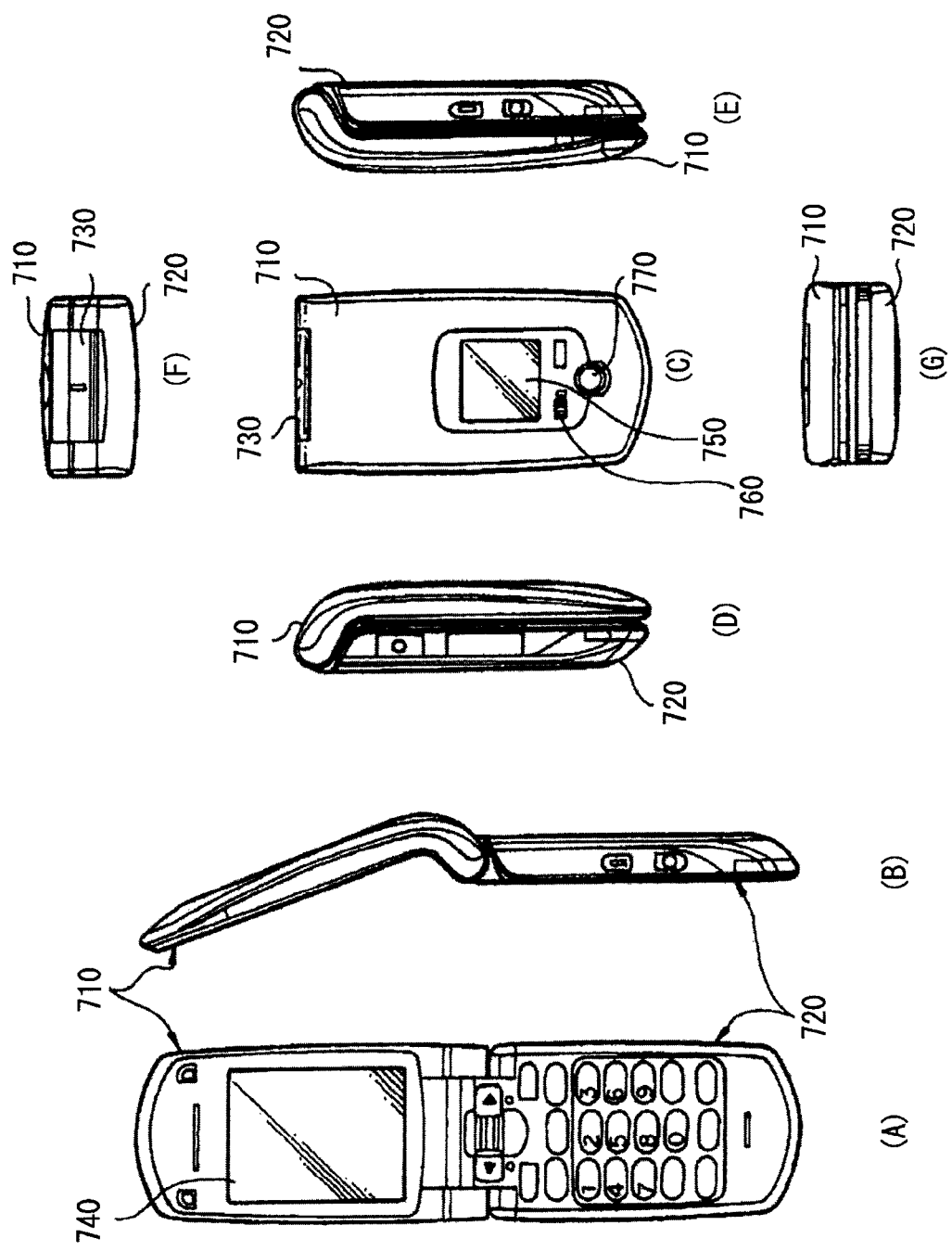
FIG. 34(A) is a front view in the open state in a fifth application example, (B) is a side view thereof, (C) is a front view in the close state, (D) is a left side view, (E) is a right side view, (F) is an upper view, and (G) is a bottom view.

FIG. 34 shows the external appearance of a mobile phone to which any of the display-and-image-pickup devices of the above embodiment and others is applied. This mobile phone is configured by an upper chassis 710 coupled to a lower chassis 720 by a coupling section (hinge section) 730, and includes a display 740, a sub-display 750, picture light 760, and a camera 770, for example. The display 740 or the sub-display 750 is configured by any of the display-and-image-pickup devices of the above embodiment and others.

While the invention has been described with the embodiment, the modified examples, and the application examples, the invention is not restricted to such an embodiment and others, and numerous other modifications and variations can be devised.

Figure 35:
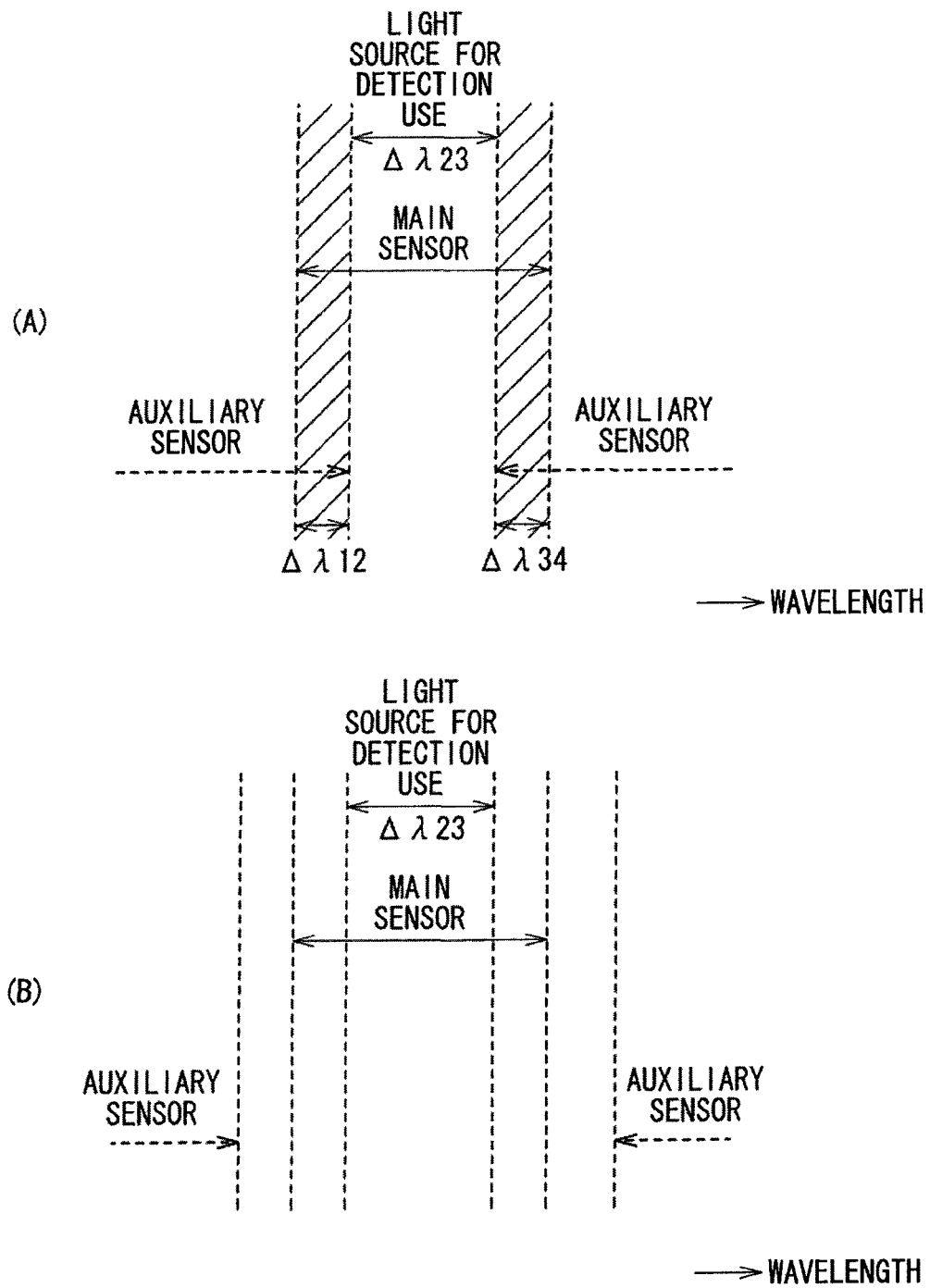
FIG. 35 is a characteristics diagram showing another exemplary relationship between the light-emitting wavelength region of the light source for detection use and the detection wavelength regions for the respective use by the main sensors and the auxiliary sensors.

As an example, in the above-described embodiment and others, as exemplarily shown in FIG. 35(A), the wavelength region Δλ12 (wavelength region of wavelength of λ1 to wavelength λ2) and the wavelength region Δλ34 (wavelength region of wavelength λ3 to wavelength λ4) are the photosensitive wavelength regions for both of the main sensors 32 and the auxiliary sensors 33. This is surely not the only possibility for application of the invention. That is, as exemplarily shown in FIG. 35(B), the light-emitting wavelength of the main sensors 32 may be isolated from the photosensitive wavelength region of the auxiliary sensors 33, and this configuration is considered preferable. Note that, in FIGS. 35(A) and (B), in the wavelength region not including the photosensitive wavelength region of the main sensors 32 indicated by a solid arrow, the main sensors 32 each have the photosensitivity of 0 (zero). Similarly, in the wavelength region not including the photosensitive wavelength region of the auxiliary sensors 33 indicated by a broken arrow, the auxiliary sensors 33 each have the photosensitivity of 0 (zero). That is, in FIG. 35(B), the auxiliary sensors 33 each show the photosensitivity of 0 (zero) in the photosensitive wavelength region of the main sensors 32, and the main sensors 32 each show the photosensitivity of 0 (zero) in the photosensitive wavelength region of the auxiliary sensors 33. As such, as described above, the photosensitive wavelength regions of these two types of sensors are isolated from each other (are not the same).

Further, in the embodiment and others above, exemplified is the case with the I/O display panel 20 being a liquid crystal panel provided with the backlight 15. Alternatively, a backlight for display use may serve also as detection light, or an irradiation light source specifically for detection use may be provided. Moreover, when such an irradiation light source is specifically provided for detection use, using light of a wavelength region not including a visible light region (e.g., infrared light) is more preferable.

Still further, in the above embodiment, exemplified is the case that, in the I/O display panel 20, the display elements are each a liquid crystal element, and the photoreceptors are provided separately. This is surely not an only possibility for application of the invention. To be specific, like the display-and-image-pickup devices of the other modified examples of FIGS. 36 to 38, for example, an I/O display panel (I/O display panel 60) may be configured by light-emitting/receiving elements (display image pickup elements) such as organic EL (ElectroLuminescence) elements that can perform a light-emitting operation and a photoreception operation in a time sharing manner.

Figure 36:
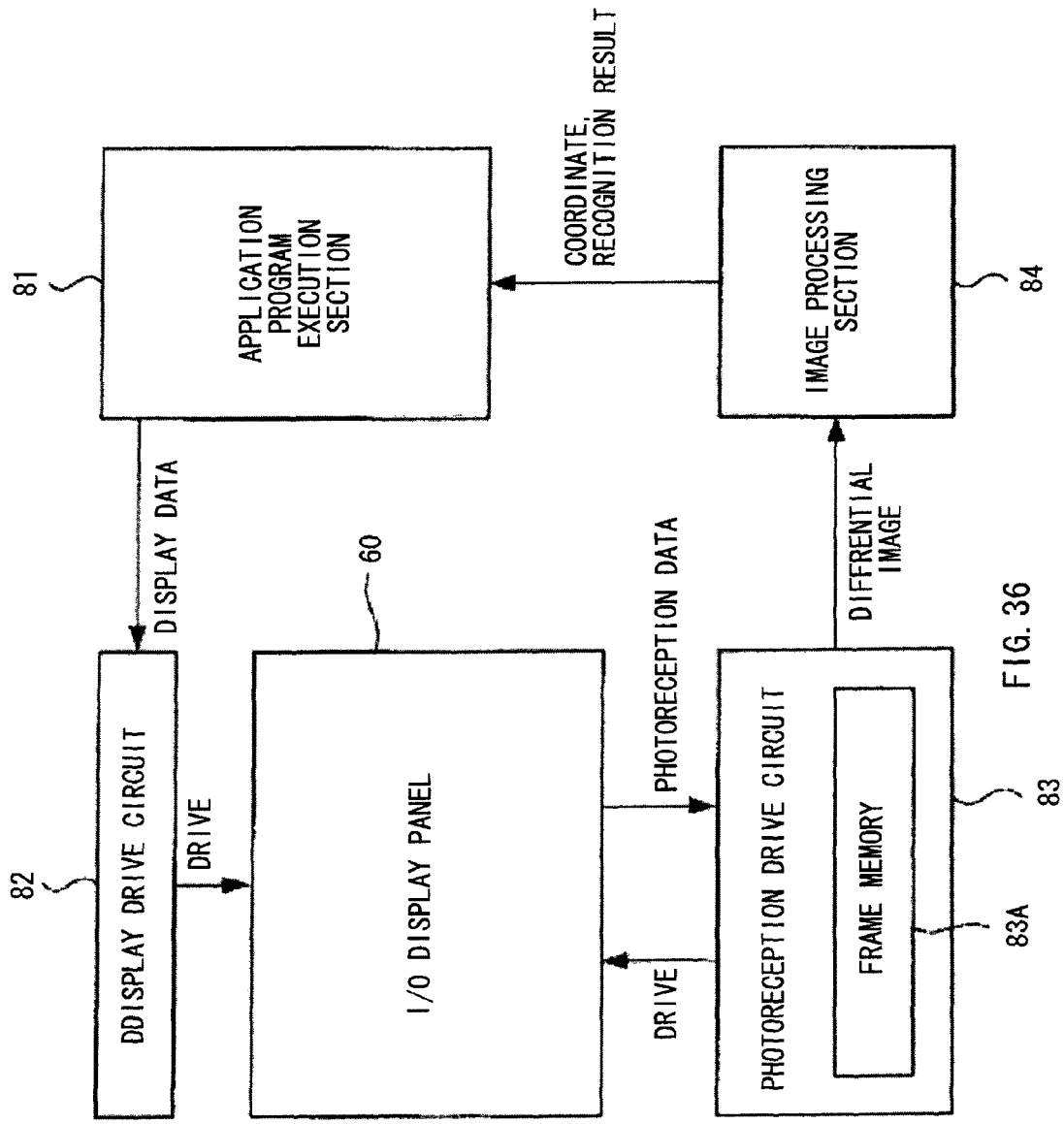
FIG. 36 is a block diagram showing the configuration of a display-and-image-pickup device of another modified example of the invention.

FIG. 36 is a block diagram showing a configuration example of a display-and-image-pickup device of this modified example. This display-and-image-pickup device is configured to include the I/O display panel 60, a display drive circuit 82, a photoreception drive circuit 83 including a frame memory 83A, an image processing section 84, and an application program execution section 81. Among these components, the display drive circuit 82, the frame memory 83A, the photoreception drive circuit 83, the image processing section 84, and the application program execution section 81 respectively operate similarly to the display drive circuit 12, the frame memory 13A, the photoreception drive circuit 13, the image processing section 14, and the application program execution section 11 described in the above embodiment, and thus are not described twice.

As described above, the I/O display panel 60 is configured as an organic EL display using the organic EL elements, and a plurality of pixels (display-and-image-pickup devices) are arranged in a matrix in a display area (sensor area). Further, in this example, this panel includes the matrix arrangement or others of pixels including the organic EL elements each functioning as a light-emitting element (display element) and a photoreceptor (image pickup element: the above-described main sensor), and pixels including the organic EL elements each functioning as a light-emitting element (display element) and a photoreceptor (image pickup element: the above-described auxiliary sensor). With such an I/O display panel 60, any signal charge accumulated corresponding to the amount of light reception in a photoreception period is to be read by the driving of the photoreception drive circuit 83 for light reception.

Figure 37:
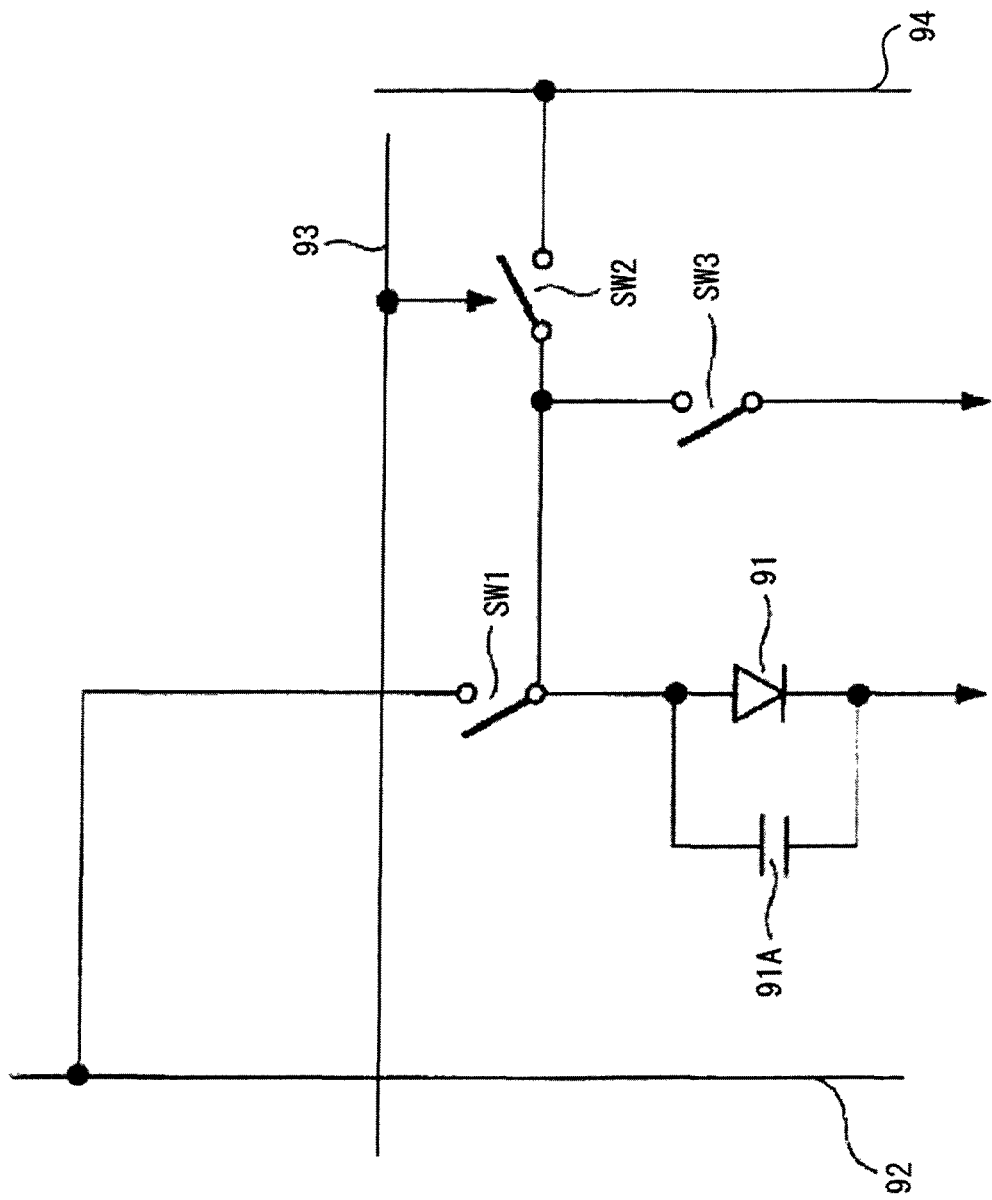
FIG. 37 is a circuit diagram showing an exemplary configuration of each pixel in the display-and-image-pickup device of FIG. 36.

FIG. 37 shows a circuit configuration example of each pixel (configuration example of a pixel circuit) in the display-and-image-pickup device of FIG. 36. This pixel circuit is configured to include an organic EL element 91, a parasitic capacity 91A of this organic EL element 91, switches SW1 to SW3, a display data signal line 92, a read line selection line 93, and a reception data signal line 94. In this pixel circuit, when the switch SW1 is set to be in the ON state in a display period (light-emitting period), display data for image display is supplied to the organic EL element 91 from the display data signal line 92 via the switch SW1 so that the organic EL element 91 performs a light-emitting operation. On the other hand, with the organic EL element 91, in a period when the light-emitting operation is stopped (photoreception period), the charge is accumulated in the parasitic capacity 91A generated in the organic EL element 91 in accordance with the amount of light entering the sensor area. Thus accumulated charge is then read to the reception data signal line 94 by the switch SW2 being set in the ON state in response to control by a signal derived from the read line selection line 93. Herein, at the beginning of the photoreception period, there needs to discharge the charge accumulated in the parasitic capacity 91A during light emission by momentarily putting the switch SW3 for reset use in the ON state.

Figure 38:
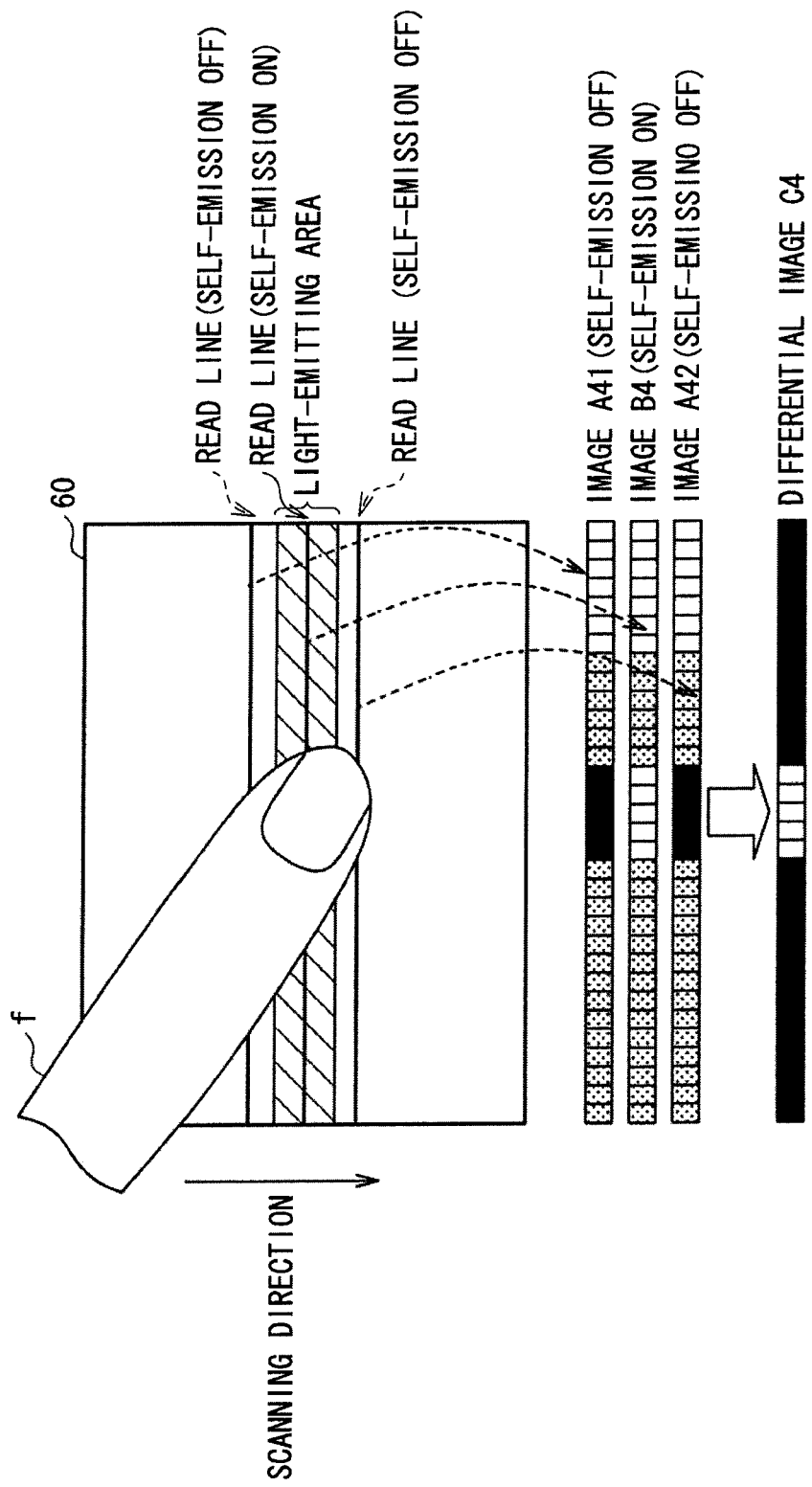
FIG. 38 is a diagram for illustrating a differential image fingertip extraction process in the display-and-image-pickup device of FIGS. 36 and 37.

FIG. 38 illustrates a differential image fingertip extraction process in the display-and-image-pickup device of FIGS. 36 and 37. To be specific, in the I/O display panel 60 using the organic EL elements described above, exemplified is a case of performing a process of detecting any object (finger f) coming in touch with or in proximal to the I/O display panel 60 while displaying images, for example. In this example, a light-emitting area is configured by a specific plurality of horizontal lines in a screen. Such a light-emitting area is moved in a field period in the direction of scanning indicated by an arrow in the drawings so that the area looks like being displayed in the entire screen by persistence of vision.

On the other hand, for a read operation of the photoreception signals, the movement of the light-emitting area is used as a cue to sequentially perform the read operation by a read line located in the light-emitting area and a read line vertically away to some degree from this light-emitting area. To be specific, with the read line in the light-emitting area, the resulting read operation is able to detect reflection light of light coming from the light-emitting area, and thus as shown in FIG. 38, the resulting read data will be in the state of self-emission ON (image B4: corresponding to the reflection-light-utilized image B). On the other hand, with the read line vertically away to some degree from the light-emitting area, the resulting read operation is not affected by light emission from the light-emitting area, and thus as shown in FIG. 38, the resulting read data will be in the state of self-emission OFF (images A41 and A42 (hereinafter, referred to as images A4): corresponding to the shade image A). As such, in this modified example, a differential image C4 obtained based on these images (=B4−A4) may be used as a basis to detect any proximity object (finger f). Also with such a configuration, the effects similar to those achieved in the above embodiment can be derived.

Moreover, in the embodiment and others above, exemplified is the display-and-image-pickup device provided with a display-and-image-pickup panel (I/O display panel 20) including a plurality of display elements and a plurality of image pickup elements. This is surely not the only possibility for application of the invention. To be specific, the invention can be applied also to an image pickup device provided not with the display elements but with an image pickup panel including a plurality of image pickup elements, for example.

The invention claimed is:

1. An image pickup device, comprising:
an image pickup panel provided with a plurality of first photoreceptors, a plurality of second photoreceptors, and an irradiation light source that emits light including detection light for detecting a proximity object, wavelengths of the detection light lying in a predetermined wavelength region; and
an image processing section performing an image processing on signals which are captured by the image pickup panel through image-picking up the proximity object, thereby acquiring object information including one or more of position, shape, or size of the proximity object, wherein
the first photoreceptors have a photosensitive characteristic different from a photosensitive characteristic of the second photoreceptors, for photosensitive wavelengths such that the first photoreceptors have a higher sensitivity in a first wavelength range relative to a sensitivity of the second photoreceptors in the first wavelength range and the second photoreceptors have a higher sensitivity in a second wavelength range relative to a sensitivity of the first photoreceptors in the second wavelength range,
a photosensitive wavelength region of the first photoreceptors includes the wavelength region of the detection light,
a photosensitivity of the second photoreceptors is lower than a photosensitivity of the first photoreceptors, in the wavelength region of the detection light, and
the image processing section acquires the object information by processing the signals coming from the first and second photoreceptors and further wherein detection signals generated by the second photoreceptors are used to identify erroneous detection signals associated with contact movement across the image pickup panel in order to eliminate the erroneous detection signals.

2. The image pickup device according to claim 1, wherein
a photosensitivity of the first photoreceptors in a first wavelength region as the wavelength region of the detection light is higher than a photosensitivity of the first photoreceptors in a second wavelength region different from the first wavelength region, and
a photosensitivity of the second photoreceptor in the first wavelength region is lower than a photosensitivity of the second photoreceptor in the second wavelength region.

3. The image pickup device according to claim 1, wherein
a photosensitivity of the first photoreceptors in a first wavelength region as the wavelength region of the detection light is higher than a photosensitivity of the first photoreceptors in a predetermined wavelength region different from the wavelength region of the detection light, and
a photosensitivity of the second photoreceptor in the first wavelength region is lower than a photosensitivity of the second photoreceptor in the predetermined wavelength region.

4. The image pickup device according to claim 1, wherein
the image processing section acquires the object information with use of a composite image obtained based on an image captured by the first photoreceptors and an image captured by the second photoreceptors.

5. The image pickup device according to claim 4, further comprising:
an image generation section that generates, for each of the first and second photoreceptor, a differential image as a difference between a reflection-light-utilized image and a shade image, the reflection-light-utilized image being obtained by the image pickup panel through image-picking up the proximity object with use of reflection light derived from the detection light, and the shade image being obtained by the image pickup panel through image-picking up a shadow of the proximity object, wherein
the image processing section acquires the object information with use of a composite image obtained based on a first differential image and a second differential image, the first differential image corresponding to the differential image as a difference between a reflection-light-utilized image obtained by the first photoreceptors and a shade image obtained by the first photoreceptors, and the second differential image corresponding to the differential image as a difference between a reflection-light-utilized image obtained by the second photoreceptors and a shade image obtained by the second photoreceptor.

6. The image pickup device according to claim 5, wherein
the image generation section generates a predetermined mask image based on the second differential image, and
the image processing section acquires the object information with use of a composite image of the first differential image and the mask image.

7. The image pickup device according to claim 5, wherein
the image generation section generates the mask image by subjecting the second differential image to a binarization process and an image reversal process.

8. The image pickup device according to claim 5, wherein
the image generation section performs a process of generating the first differential image and a process of generating the second differential image by sequential processing for each of the first and second photoreceptors.

9. The image pickup device according to claim 8, wherein
the image pickup panel is configured in such a manner that the first photoreceptor and the second photoreceptor are disposed alternately with a one-to-one ratio.

10. The image pickup device according to claim 9, wherein
the first differential image is configured of a plurality of first differential pixel values, and the second differential image is configured of a plurality of second differential pixel values, and
in the sequential processing,
the image generation section determines the first differential pixel value coming from a first photoreceptor of the first photoreceptors as being zero and then outputs the determined value, when the second differential pixel value obtained by a second photoreceptor, of the second photoreceptor, adjacent to the first photoreceptor is equal to or larger than a predetermined threshold value, and
the image generation section outputs an actual differential computation result in the first photoreceptor as the first differential pixel value, when the second differential pixel value obtained by a second photoreceptor, of the second photoreceptors, adjacent to the first photoreceptor, is smaller than the threshold value.

11. The image pickup device according to claim 10, wherein
in the sequential processing, the image generation section performs processes of:
generating and interpolating the first differential pixel value to each of positions of the second photoreceptors, as a first interpolation differential pixel value;
generating and interpolating the second differential pixel value to each of positions of the first photoreceptors, as a second interpolation differential pixel value; and
executing the sequential processing in accordance with a result of comparison with the threshold value as well as in consideration of the first and second interpolation differential pixel values.

12. The image pickup device according to claim 1, wherein the image processing section acquires the object information based on a differential image as a difference between a reflection-light-utilized image obtained by the plurality of first photoreceptors through image-picking up the proximity object with use of reflection light derived from the detection light, and a reflection-light-utilized image obtained by the plurality of second photoreceptors through image-picking up the proximity object with use of the reflection light derived from the detection light.

13. The image pickup device according to claim 1, wherein the photosensitivity of the second photoreceptors in the wavelength region of the detection light is 0 (zero).

14. The image pickup device according to claim 13, wherein
the photoreception wavelength region of the first photoreceptors and a photoreception wavelength region of the second photoreceptors are separated from each other.

15. The image pickup device according to claim 1, wherein the detection light is infrared light,
the photoreception wavelength region of the first photoreceptors includes a wavelength region of the infrared light, and
the photoreception wavelength region of the second photoreceptors includes a wavelength region of visible light.

16. A display-and-image-pickup device, comprising:
a display-and-image-pickup panel provided with a plurality of display elements, a plurality of first photoreceptors and a plurality of second photoreceptors, and emitting light including detection light for detecting a proximity object, wavelengths of the detection light lying in a predetermined wavelength region; and
an image processing section performing an image processing on signals which are captured by the display-and-image-pickup panel through image-picking up the proximity object, thereby acquiring object information including one or more of position, shape, or size of the proximity object, wherein
the first photoreceptors have a photosensitive characteristic different from a photosensitive characteristic of the second photoreceptors, for photosensitive wavelengths such that the first photoreceptors have a higher sensitivity in a first wavelength range relative to a sensitivity of the second photoreceptors in the first wavelength range and the second photoreceptors have a higher sensitivity in a second wavelength range relative to a sensitivity of the first photoreceptors in the second wavelength range,
a photosensitive wavelength region of the first photoreceptors includes the wavelength region of the detection light,
a photosensitivity of the second photoreceptors is lower than a photosensitivity of the first photoreceptors, in the wavelength region of the detection light, and
the image processing section acquires the object information by processing the signals coming from the first and second photoreceptors and further wherein detection signals generated by the second photoreceptors are used to identify erroneous detection signals associated with contact movement across the image pickup panel in order to eliminate the erroneous detection signals.

17. The display-and-image-pickup device according to claim 16, wherein
the display-and-image-pickup panel is provided with an irradiation light source that emits light including the detection light.

18. The display-and-image-pickup device according to claim 16, wherein
the display elements each emit light including the detection light.

19. An electronic device having a display-and-image-pickup device provided with an image display function and an image pickup function, the display-and-image-pickup device includes:
a display-and-image-pickup panel provided with a plurality of display elements, a plurality of first photoreceptors and a plurality of second photoreceptors, and emitting light including detection light for detecting a proximity object, wavelengths of the detection light lying in a predetermined wavelength region; and
an image processing section performing an image processing on signals which are captured by the display-and-image-pickup panel through image-picking up the proximity object, thereby acquiring object information including one or more of position, shape, or size of the proximity object, wherein
the first photoreceptors have a photosensitive characteristic different from a photosensitive characteristic of the second photoreceptors, for photosensitive wavelengths such that the first photoreceptors have a higher sensitivity in a first wavelength range relative to a sensitivity of the second photoreceptors in the first wavelength range and the second photoreceptors have a higher sensitivity in a second wavelength range relative to a sensitivity of the first photoreceptors in the second wavelength range,
a photosensitive wavelength region of the first photoreceptors includes the wavelength region of the detection light,
a photosensitivity of the second photoreceptors is lower than a photosensitivity of the first photoreceptors, in the wavelength region of the detection light, and
the image processing section acquires the object information by processing the signals coming from the first and second photoreceptors and further wherein detection signals generated by the second photoreceptors are used to identify erroneous detection signals associated with contact movement across the image pickup panel in order to eliminate the erroneous detection signals.

* * * * *